US010661286B1

(12) United States Patent
Krombein

(10) Patent No.: US 10,661,286 B1
(45) Date of Patent: *May 26, 2020

(54) WATERJET APPARATUS WITH PLASTER ATTACHMENT DEVICE FOR CLEANING ARTIFICIAL BODIES OF WATER

(71) Applicant: Todd Krombein, Phoenix, AZ (US)

(72) Inventor: Todd Krombein, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/890,145

(22) Filed: Feb. 6, 2018

Related U.S. Application Data

(60) Provisional application No. 62/456,018, filed on Feb. 7, 2017, provisional application No. 62/480,155, filed on Mar. 31, 2017.

(51) Int. Cl.
| | | |
|---|---|---|
| *B05B 1/34* | (2006.01) | |
| *E04H 4/12* | (2006.01) | |
| *C02F 103/42* | (2006.01) | |
| *C02F 1/00* | (2006.01) | |
| *B08B 3/02* | (2006.01) | |

(52) U.S. Cl.
CPC .............. *B05B 1/34* (2013.01); *E04H 4/1209* (2013.01); *B08B 3/02* (2013.01); *C02F 1/001* (2013.01); *C02F 2103/42* (2013.01)

(58) Field of Classification Search
CPC . B05B 1/34; E04H 4/1209; B08B 3/02; C02F 1/001; C02F 2103/42
USPC .......... 239/203–205, 288–288.5, 589; 4/490, 4/492
See application file for complete search history.

(56) References Cited

U.S. PATENT DOCUMENTS

| | | | | |
|---|---|---|---|---|
| 4,939,797 | A | * | 7/1990 | Goettl ..................... E04H 4/169 4/490 |
| 5,251,343 | A | * | 10/1993 | Goettl ..................... B05B 15/70 239/204 |
| 6,340,035 | B2 | | 1/2002 | Wright |
| 6,643,857 | B1 | | 11/2003 | Kenna et al. |
| 6,971,588 | B1 | | 12/2005 | Tarr et al. |
| 8,308,081 | B1 | | 11/2012 | Goettl |

(Continued)

OTHER PUBLICATIONS

In-Floor Cleaning & Circulation, PCC 2000, Paramount, Chandler, Arizona, USA, http://1paramount.com/products/aapdf/PCC2000Brochure.pdf, document available on or before Mar. 9, 2009 (per Internet Archive Wayback Machine, http://web.archive.org/web/20090309014554/http://1paramount.com/products/pcc/ linking to http://web.archive.org/web/20160128003601/http://www.1paramount.com/products/aapdf/PCC2000Brochure.pdf), Accessed on Nov. 7, 2016, 12 pages.

(Continued)

*Primary Examiner* — Steven J Ganey
(74) *Attorney, Agent, or Firm* — Knobbe Martens Olson & Bear LLP

(57) ABSTRACT

A waterjet apparatus can be installed a wall for containing an artificial body of water, such as a pool bottom and/or sidewalls. The waterjet apparatus can be used with an intermittently operated water delivery system to clean pool bottom and/or sidewalls. The waterjet apparatus has a plaster attachment device for securing a plaster mixture to the waterjet apparatus The plaster attachment device can protrude from or be substantially flush with the pool bottom and/or sidewalls.

15 Claims, 28 Drawing Sheets

(56) References Cited

U.S. PATENT DOCUMENTS

2002/0117225 A1    8/2002  Wright

OTHER PUBLICATIONS

Total Circulation—efficiency in energy and hydraulics, Product Catalog by A&A Manufacturing, Sep. 16, 2015, 60 pages, A&A Manufacturing, Phoenix, Arizona, USA.
U.S. Appl. No. 14/848,193, filed Sep. 8, 2015, Krombein.
Photographs of a Polaris Caretaker Pop-Up Cleaning Head, in 5 pages, sold prior to Apr. 20, 2015.

* cited by examiner

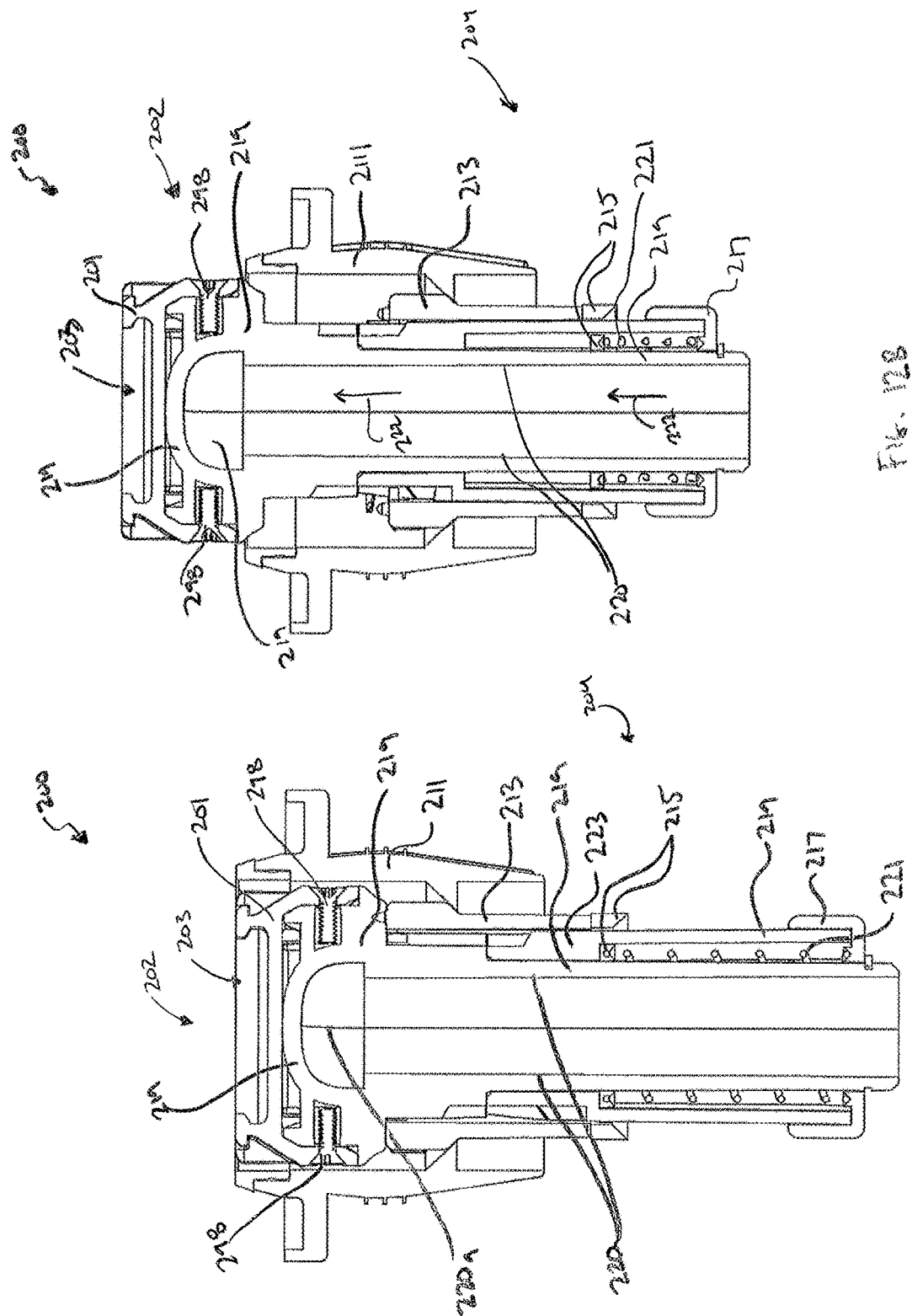

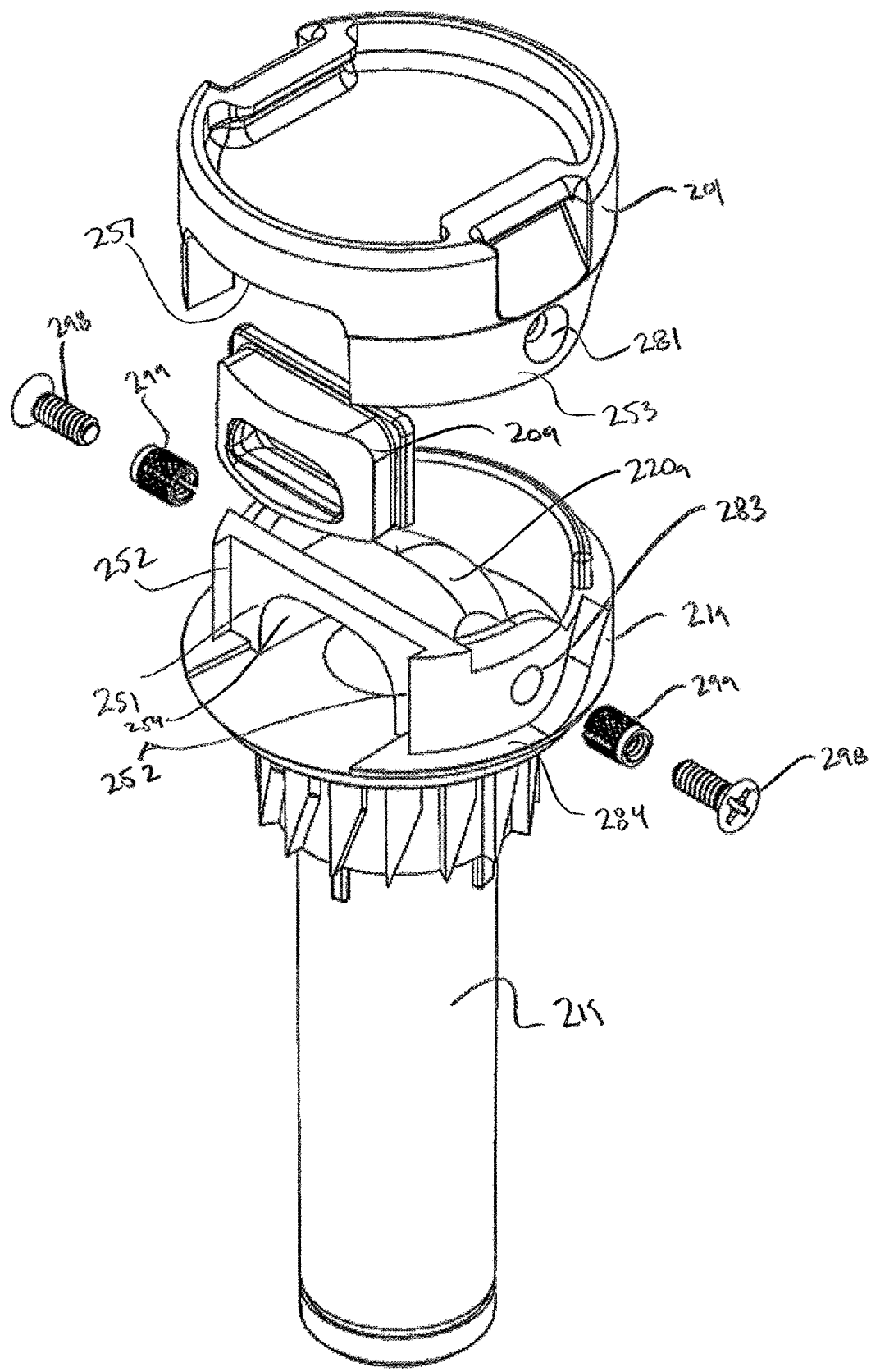
FIG. BB

WATERJET APPARATUS WITH PLASTER ATTACHMENT DEVICE FOR CLEANING ARTIFICIAL BODIES OF WATER

INCORPORATION BY REFERENCE TO ANY PRIORITY APPLICATIONS

Any and all applications for which a foreign or domestic priority claim is identified in the Application Data Sheet as filed with the present application are incorporated by reference and made a part of this specification.

BACKGROUND

Field

The present disclosure generally relates to waterjet apparatus for cleaning artificial bodies of water, and in particular, waterjet apparatus for cleaning a pool, spa, or the like.

Description of the Related Art

Artificial bodies of water, such as pools, spas, fountains, ornamental ponds, utility ponds and the like, typically have filter systems that allow the water in the body of water to be filtered and cleaned. Typically, the water is removed from the artificial body of water via a drain and is pumped through a filtration or cleaning system. It is preferable that the water flows through the system as efficiently as possible. Waterjet delivery devices such as cleaning heads are often used as part of an in-floor pool cleaning system to circulate jets of water near the floor and sidewalls of a pool.

These in-floor cleaning heads are usually made of plastic, mounted flush with the adjoining surface of the pool and intermittently supplied with pressurized water to activate them. When the cleaning heads are activated, they usually extend beyond the surface of the pool to direct a jet of water from a nozzle across the adjacent surface to dislodge debris from the pool surface and place it in suspension for subsequent removal by the pool filter.

This Background is provided to introduce a brief context for the Summary and Detailed Description that follow. This Background is not intended to be viewed as limiting the claimed subject matter to implementations that solve any or all of the disadvantages or problems presented herein.

SUMMARY

A waterjet apparatus according to an embodiment of the present disclosure for in-floor swimming pool and spa cleaning systems is provided. The apparatus comprises a cylindrical sleeve; a elastically biased hollow stem positioned inside the cylindrical sleeve; a nozzle head member having a plaster attachment device comprising a plaster opening and a sidewall, the plaster opening configured to receive and support plaster mixtures substantially matching plaster mixtures of a wall configured to contain an artificial body of water, the plaster opening configured to support plaster at a desired depth, the sidewall configured to support plaster at a desired radius. Disclosure directed to waterjet apparatuses is discussed in U.S. patent application Ser. No. 14/848,193, filed on Sep. 8, 2015, and titled "WATERJET APPARATUS WITH PLASTER ATTACHMENT DEVICE FOR CLEANING ARTIFICIAL BODIES OF WATER," which is incorporated by reference and made a part of this specification.

A waterjet apparatus according to an embodiment of the present disclosure for cleaning an artificial body of water is provided. The apparatus comprises a housing having a housing periphery about a central axis of the housing wherein the housing periphery defining an outermost boundary of the housing; a head movably connected to the housing, the head configured to reciprocate correspondingly with an intermittent delivery of pressurized water and configured to direct the pressurized water along a desired direction to clean the artificial body of water, wherein the head rotates about the central axis of the housing after delivery of pressurized water; and a plaster attachment device connected to the head, the plaster attachment device comprising a plaster device periphery about the central axis, the plaster device periphery substantially aligned with the housing periphery along the central axis, and the plaster attachment device comprising a plaster opening and a sidewall, the plaster opening configured to receive and support plaster mixtures substantially matching plaster mixtures of a wall configured to contain the artificial body of water, the plaster opening configured to support plaster at a desired depth, the sidewall configured to support plaster at a desired radius.

A waterjet apparatus according to an embodiment of the present disclosure for cleaning an artificial body of water is provided. The apparatus comprises a body having a nozzle opening, the nozzle opening configured to direct pressurized water along a desired direction to clean the artificial body of water; and a plaster attachment device connected to the body, the plaster attachment device comprising a plaster cavity configured to retain plaster.

A waterjet apparatus for in-floor swimming pool cleaning systems according to an embodiment of the present disclosure is provided. The waterjet apparatus comprises a plaster attachment device for securing and confining plaster, such as a plaster mixture, to a predetermined area on the waterjet apparatus. The apparatus can include a plaster opening having a plaster securing upper surface with sidewalls to contain a plaster mixture which may include material or structure formed from a loosely compacted mass of fragments or particles such as pebbles. The apparatus can have other structures such as flanges, protrusions, bosses, grooves, indentations, and/or the like to facilitate securing the plaster in the plaster opening. The plaster attachment device can include slots for mating with maintenance tools where, for example, surface finish area is maximized relative to the dimension (e.g., diameter) of the waterjet apparatus.

The plaster attached to the waterjet apparatus can vary to match the wall and floor of the pool. In some embodiments, the waterjet apparatus comprises a top having an upper surface and a side surface wherein the side surface includes at least one opening permitting fluid communication therethrough between internal mechanisms of the waterjet apparatus and artificial body of water. A section of the upper surface is recessed so as to define a cavity region wherein the cavity region is configured to retain plaster so as to provide the upper surface of the waterjet apparatus with a plaster finish.

In some embodiments, the cavity is approximately between ⅛ inches to 1 inch deep and extends from the center of the upper surface to the outer perimeter of the upper surface. The cavity region can be defined by a sidewall that extends outward from the plane of the upper surface. In some embodiments, the sidewall extends outward from the plane of the upper surface and simultaneously extends inward toward the center of the upper surface to facilitate retention of the plaster finish. In some embodiments, the waterjet apparatus is formed of a clear material so that it is camouflaged by the plaster. The waterjet apparatus can be circular in shape like most conventional cleaning heads; however, the waterjet apparatus can take on a variety of other shapes.

A waterjet apparatus for cleaning an artificial body of water according to an embodiment of the present disclosure includes one or more of the following: a housing; a head movably connected to the housing, the head configured to reciprocate correspondingly with an intermittent delivery of pressurized water and configured to direct the pressurized water along a desired direction, wherein the head rotates about a central axis of the waterjet apparatus after delivery of pressurized water; and a plaster attachment device connected to the head, the plaster attachment device configured to receive plaster substantially matching plaster of a wall for pools and spas.

In some embodiments, the waterjet apparatus can further include one or more of the following: the plaster attachment device comprises an opening configured to house the plaster; the opening has a depth along the central axis of about ⅛ inches to about 1 inch; and/or the plaster device comprises a flange extending into the opening, the flange configured to retain the plaster in the opening.

A waterjet head for cleaning an artificial body of water according to an embodiment of the present disclosure includes one or more of the following: a body comprising a nozzle opening configured to direct pressurized water along a desired direction to clean the artificial body of water, wherein the body rotates about a central axis of the body after delivery of the pressurized water; and/or a plaster attachment device connected to the body, the plaster attachment device configured to receive plaster substantially similar to plaster of a surface configured to contain the artificial body of water, the plaster attachment device comprising a cutout such as a slot, slit, and/or other opening positioned proximate to a perimeter of the plaster attachment device.

In some embodiments, the waterjet head can further include one or more of the following: the plaster attachment device comprises another cutout positioned proximate to the perimeter of the plaster attachment device and opposite the cutout relative to the central axis; the cutout comprises an indentation in a wall surface of the plaster attachment device, the wall surface extending along the perimeter of the plaster attachment device about the central axis to form an outer-most boundary of the plaster attachment device; the indentation is substantially rectangular; the cutout is configured to engage a tool configured to rotate the plaster attachment device about the central axis; the plaster attachment device comprises a plaster opening configured to support the plaster of the plaster attachment device; the plaster opening has a depth along the axis of about ⅛ inches to about 1 inch; the plaster opening comprises a bottom and a sidewall configured to retain the plaster of the plaster attachment device in a desired portion relative to the plaster attachment device; the bottom extends radially outward relative to the central axis, and wherein the sidewall extends along the central axis and substantially perpendicular to the bottom; the plaster attachment device comprises a flange extending into the plaster opening toward the central axis, the flange configured to retain the plaster of the plaster attachment device in the plaster opening; and/or the plaster attachment device extends radially outward from the body relative to the central axis.

In some embodiments, the waterjet apparatus can further include one or more of the following: a housing comprising a housing periphery about a central axis of the housing, the housing periphery defining an outermost boundary of the housing; a head movably connected to the housing, the head configured to reciprocate correspondingly with an intermittent delivery of pressurized water and configured to direct the pressurized water along a desired direction to clean the artificial body of water, wherein the head rotates about the central axis of the housing with each intermittent delivery of pressurized water; a plaster attachment device connected to the head, the plaster attachment device comprising a plaster device periphery about the central axis, the plaster device periphery substantially aligned with the housing periphery along the central axis, and the plaster attachment device comprising a plaster opening, a sidewall, a cutout at the plaster device periphery, and a flange extending into the plaster opening; the plaster opening configured to receive and support plaster mixtures substantially matching plaster mixtures of a wall configured to contain the artificial body of water, the plaster opening configured to support plaster at a desired depth, the sidewall configured to support plaster at a desired radius, and the cutout extending inwardly from the plaster device periphery to at least partially form the plaster device periphery and the flange extending from the cutout into plaster opening to maintain the plaster in the plaster opening, at least a portion of the sidewall extending inwardly to form the cutouts. The cutout is configured to mate with a maintenance tool capable of rotating the housing about the central axis via engagement of at least one of a protrusion or an engagement cutout on the housing without the delivery of pressurized water. The waterjet apparatus can be used with a cap configured to engage at least one of the plaster device or the housing, the cap comprising a major inner surface that is configured to be away from the at least one of the plaster attachment device or the housing to form a lumen between the inner surface and the at least one of the plaster attachment device or the housing.

The foregoing is a summary and contains simplifications, generalization, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

FIG. 12A illustrates a cross-sectional view of the waterjet apparatus of FIG. 11A with the stem in the retracted position.

FIG. 12B illustrates a cross-sectional view of the waterjet apparatus of FIG. 11A with the stem in the extended position.

FIG. 13B illustrates an isometric exploded view of the stem, stem cap, and nozzle of FIG. 13A.

DETAILED DESCRIPTION

Figure 1A:
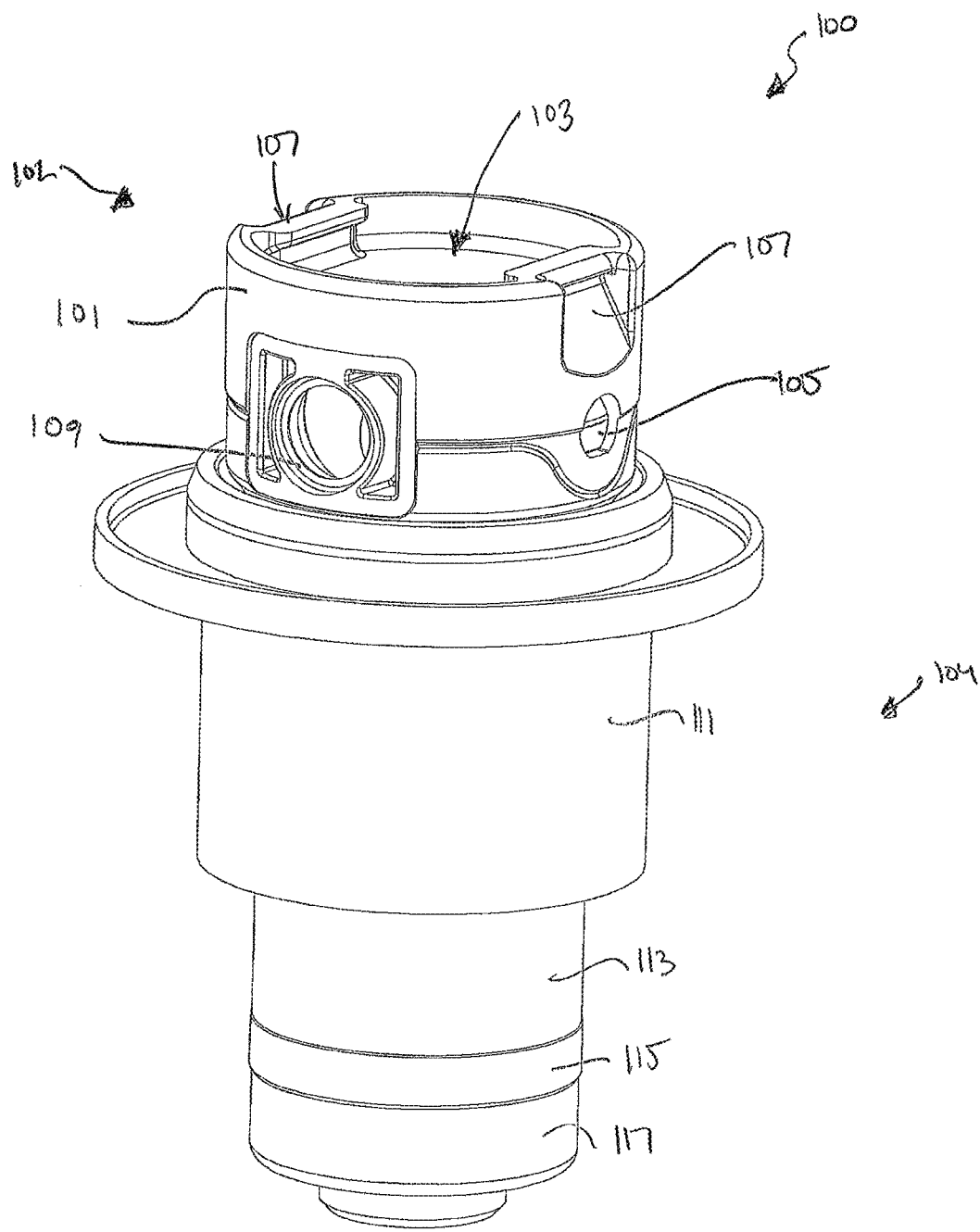
FIG. 1A illustrates a top isometric view of an embodiment of a waterjet apparatus.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and made a part of this disclosure.

FIG. 1A illustrates a top isometric view of an embodiment of a waterjet apparatus 100. The waterjet apparatus 100 may be similar to the waterjet apparatus 200 described below and can include any features of the waterjet apparatus 200 described below. The waterjet apparatus 100 is configured to be installed in a wall or floor of an artificial body of water. The waterjet apparatus 100 includes a head 102 which pops up to supply a jet of water (from the nozzle 109) as part of a cleaning system for the artificial body of water. Additional information on the waterjet apparatus generally can be found in U.S. patent application Ser. No. 14/848,193, filed on Sep. 8, 2015, and titled "WATERJET APPARATUS WITH PLASTER ATTACHMENT DEVICE FOR CLEANING ARTIFICIAL BODIES OF WATER," which is incorporated by reference and made a part of this specification.

The waterjet apparatus 100 includes a removable stem cap or plaster attachment device 101. The removable stem cap 101 includes a plaster opening 103. The plaster opening 103 can be a recess formed in a top surface of the removable stem cap 101. In some embodiments, the plaster opening 103 is configured to house, retain, contain, support, engage and/or allow attachment of plaster, cement, grout, mortar, sand, binder, pebble, rocks, aggregate material and/or a surface finish. The plaster opening 103 is sized to receive sufficient plaster so that the upper surface of the waterjet apparatus 100 appears to have a finish comprised of plaster or plaster mixed in with loosely compacted mass of fragments or particles such as pebbles. In some embodiments, the plaster opening 103 may accommodate vinyl.

As illustrated, for some embodiments, the removable stem cap 101 includes engagement features 107. The engagement features 107 can be configured to engage with a corresponding removal tool, for example, the removal tool 700 illustrated in FIG. 7. In some embodiments, the engagement features 107 can be grooves or indentations.

The waterjet apparatus 100 includes a release actuator 105 that can be actuated to allow removal the removable stem cap 101. For example, the release actuator 105 can comprise a button which secures the removable stem cap 101 to the waterjet apparatus 100, and, which when actuated (e.g., pressed) allows the removable stem cap 101 to be removed from the waterjet apparatus 100. Although only one release actuator 105 is visible in FIG. 1A, the waterjet apparatus 100 may include more than one.

As illustrated, for some embodiments, the waterjet apparatus 100 includes a removable nozzle 109. As will be discussed below, in some embodiments, when the removable stem cap 101 is removed, the removable nozzle 109 can also be removed and replaced with a different removable nozzle 109. Thus, the waterjet apparatus 100 can use a plurality of interchangeable removable nozzles 109. This may allow user to select a particular removable nozzle 109 to achieve a desired flow characteristic, such as depending on the size of the orifice of the removable nozzle 109 that allows for water flow out of the removable nozzle 109.

As illustrated in FIG. 1A, the waterjet apparatus 100 also includes a housing 104. The housing 104 includes a pipe fitting 111, an actuation collar 113, a spring actuation ring 115, a spring actuation stop 117, and a guide member 123. The housing 104 is configured to allow the head 102 to pop up when pressurized water is supplied to the waterjet apparatus 100. In general, pressurized water is alternatingly supplied to the waterjet apparatus 100. Each time pressurized water is supplied, the head 102 pops up and rotates slightly. When the pressurized water is removed, the head 102 pops back down, again rotating slightly. Thus, by alternatingly supplying pressurized water to the waterjet apparatus 100, the direction of the nozzle 109 can be varied. Additional information about this functionality is included in the Appendix.

Figure 1B:
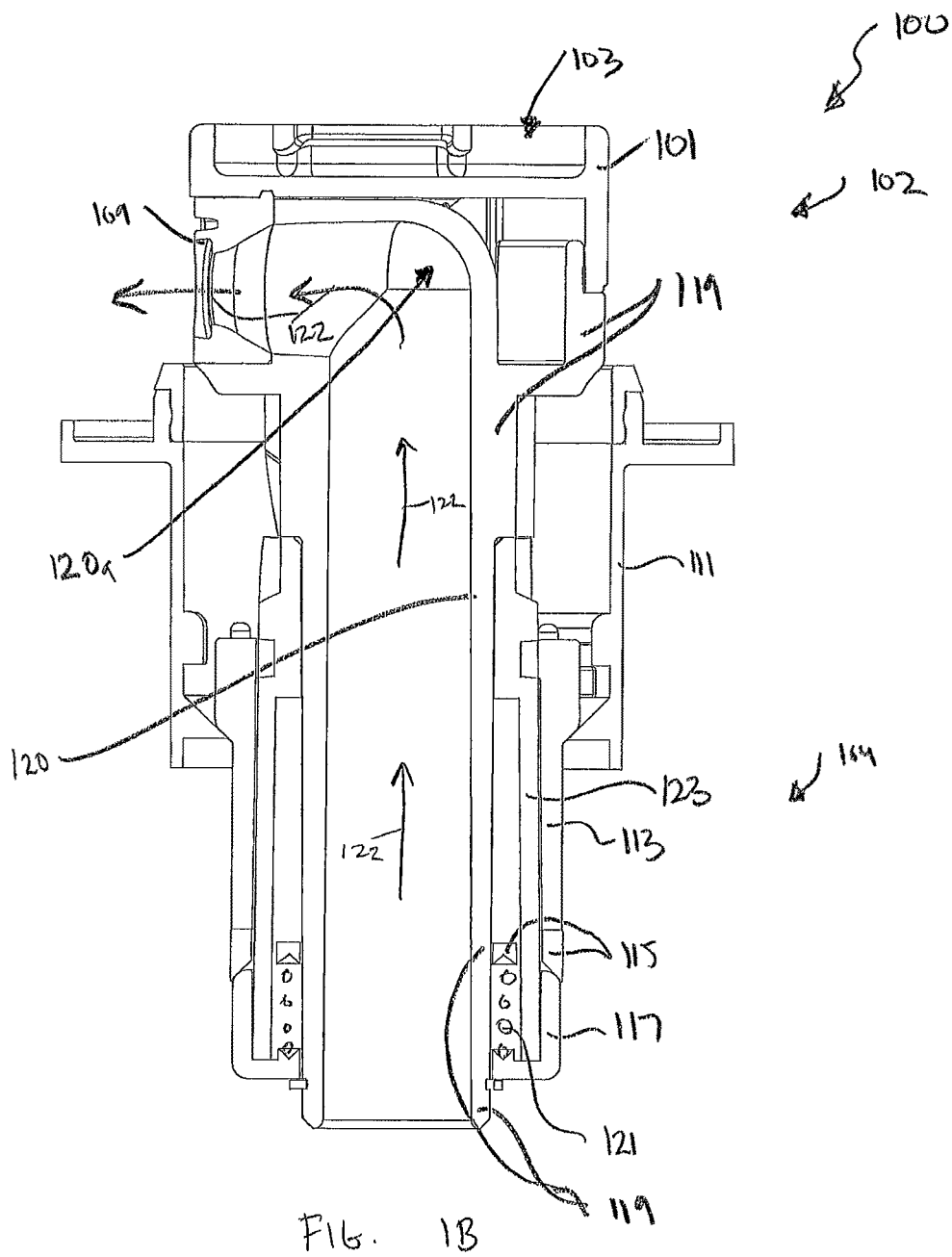
FIG. 1B illustrates a cross-sectional view of the waterjet apparatus of FIG. 1.

FIG. 1B illustrates a cross-sectional view of the waterjet apparatus 100 of FIG. 1. As shown in the illustrated embodiment, the removable stem cap 101 is removably attached to a top portion of a stem 119. The stem 119 extends through the head 102 and the body 104. For example, the stem 119 extends from the removable stem cap 101 through the pipe fitting 111, the actuation collar 113, the spring actuation ring 115, the spring actuation stop 117, and the guide member 123 as shown.

As illustrated, for some embodiments, an interior portion of the stem 119 includes a conduit 120 that is defined within the stem 119. When pressurized water is supplied to the waterjet apparatus 100, it flows through the conduit 120 in the direction of arrows 122. As shown, the pressurized water exits the nozzle 109. In some embodiments, the interior of the conduit 120 can be substantially smooth to minimize turbulent flow. As illustrated, for some embodiments, the conduit 120 includes a 90-degree bend 120a. The 90-degree bend 120a can be rounded. The 90-degree bend 120a can minimize turbulent flow and/or produce other desirable flow characteristics. As illustrated, the conduit 120 and the 90-degree bend 120a can form a continuous path to the removable nozzle 109 substantially without water leakage to, for example, the removable stem cap 101.

The pipe fitting 111 can be configured to mount the waterjet apparatus 100 into the floor or wall of an artificial body of water. The actuation collar 113 can be configured to interact with the stem 119 and the guide member 123 to allow for rotation of the head 102 each time the head 102 pops up (as well be described in greater detail below with reference to FIGS. 2A and 2B). A spring 121 is positioned between the spring actuation ring 115 and the spring actuation stop 117. As illustrated, for some embodiments (with the head 102 popped up), the spring 121 is in a compressed state. When pressurized water is supplied to the waterjet apparatus 100, the pressure overcomes the force of the spring 121, compressing it as the head 102 pops up. When the pressurized water is removed, the spring 121 expands drawing the head 102 back within the body 104.

Figure 2A:
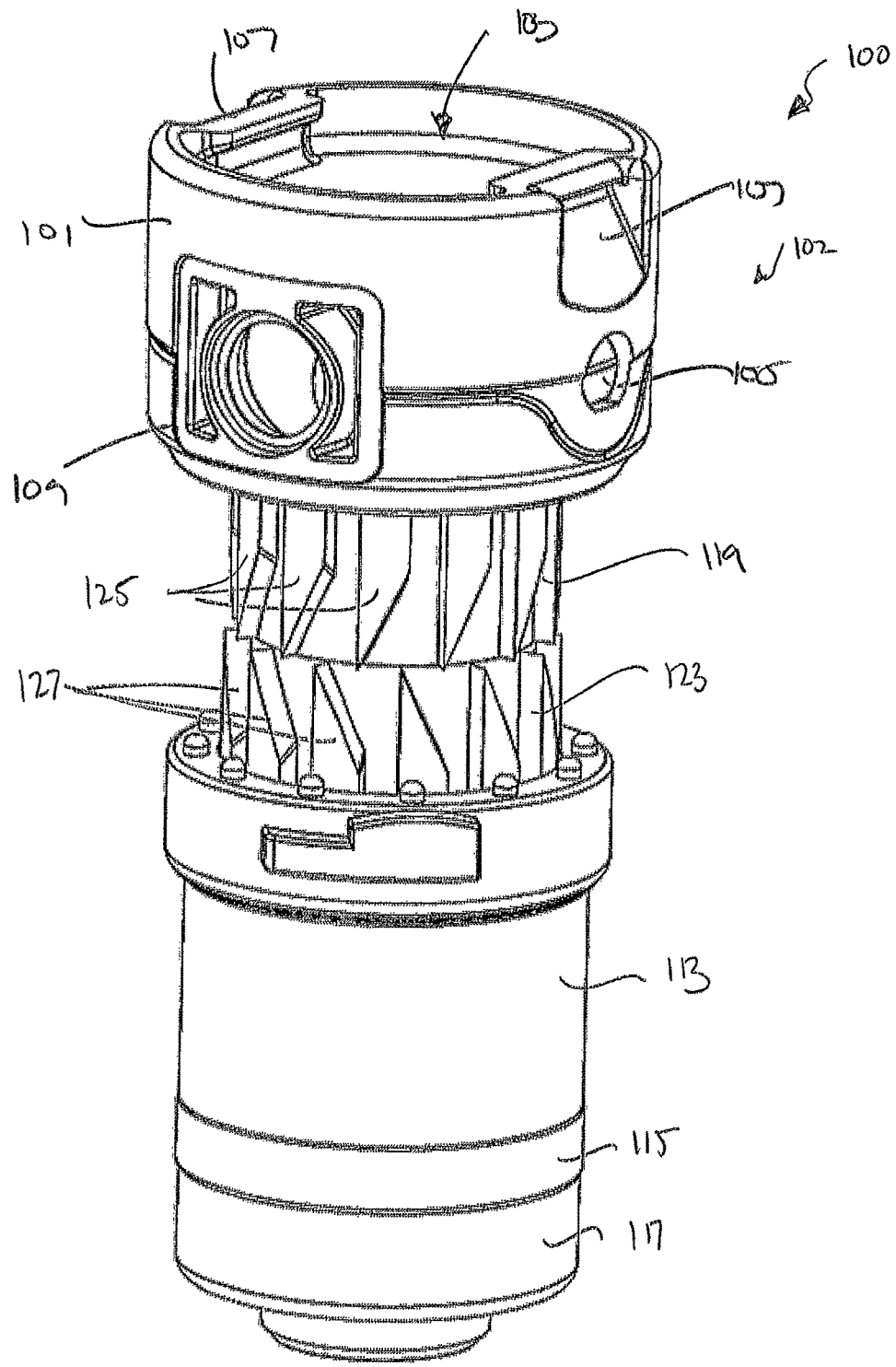
FIG. 2A illustrates a top isometric view of an embodiment of a waterjet apparatus.

FIG. 2A illustrates a top isometric view of the waterjet apparatus 100, with the pipe fitting 111 removed. With the pipe fitting 111 removed, teeth 125 on the stem 119 are visible. The teeth 125 can include an angled surface as shown. In some embodiments, the stem 119 includes twelve teeth 125, although other numbers are possible. The guide member 123 also includes teeth 127. The teeth 127 can include an angled surface as shown. In some embodiments, the guide member 123 includes twelve teeth 127, although other numbers are possible. For example, with less teeth 125, 127, relatively more robust protrusions 133 (as well as relatively more robust teeth 125, 127) may be used to increase the lifespan of the teeth 125, 127 and protrusions 133. The teeth 125 can be offset relative to the teeth 127 as shown.

Figure 2B:
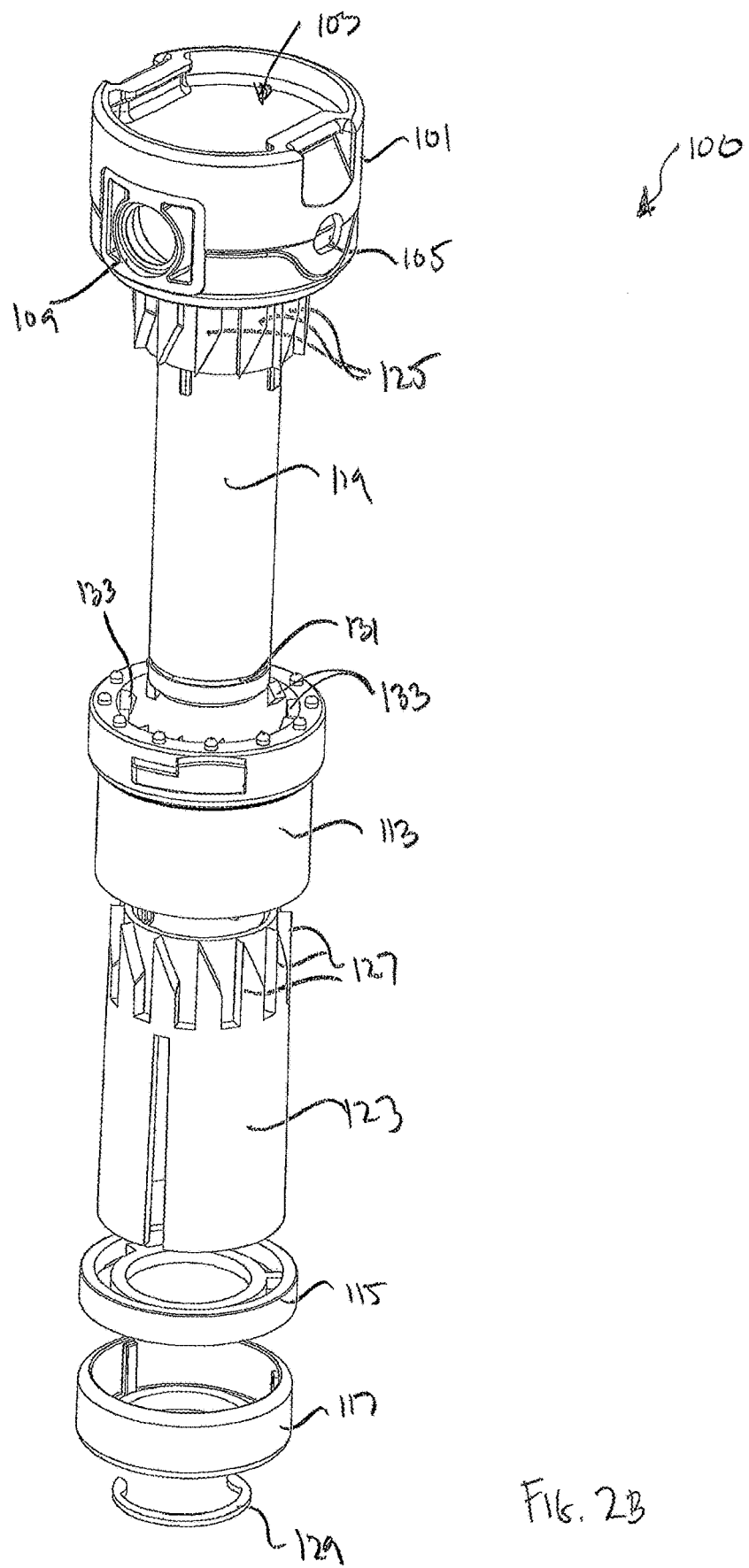
FIG. 2B illustrates an exploded top isometric view of the waterjet apparatus of FIG. 2A.

As shown in the exploded view of FIG. 2B, an interior surface of the actuation collar 113 includes protrusions 133. As an alternating supply of pressurized water causes the head 102 to pop up, the protrusions 133 interact with the teeth 125, 127 to cause the head 102 to rotate slightly each time.

As shown in FIG. 2B, the bottom of the stem 119 can include a groove 131. The groove 131 can be configured in size and shape to engage a circlip or c-clip 129. When the waterjet apparatus 100 is assembled, the actuation collar 113, the spring actuation ring 115, the spring actuation stop 117, and the guide member 123 can be assembled over the stem 119 and secured from below by the c-clip 129. The c-clip 129 can help with disassembly and maintenance of the waterjet apparatus 100 by minimizing, for example, sonic welding used to secure components of the waterjet apparatus 100.

Figure 3A:
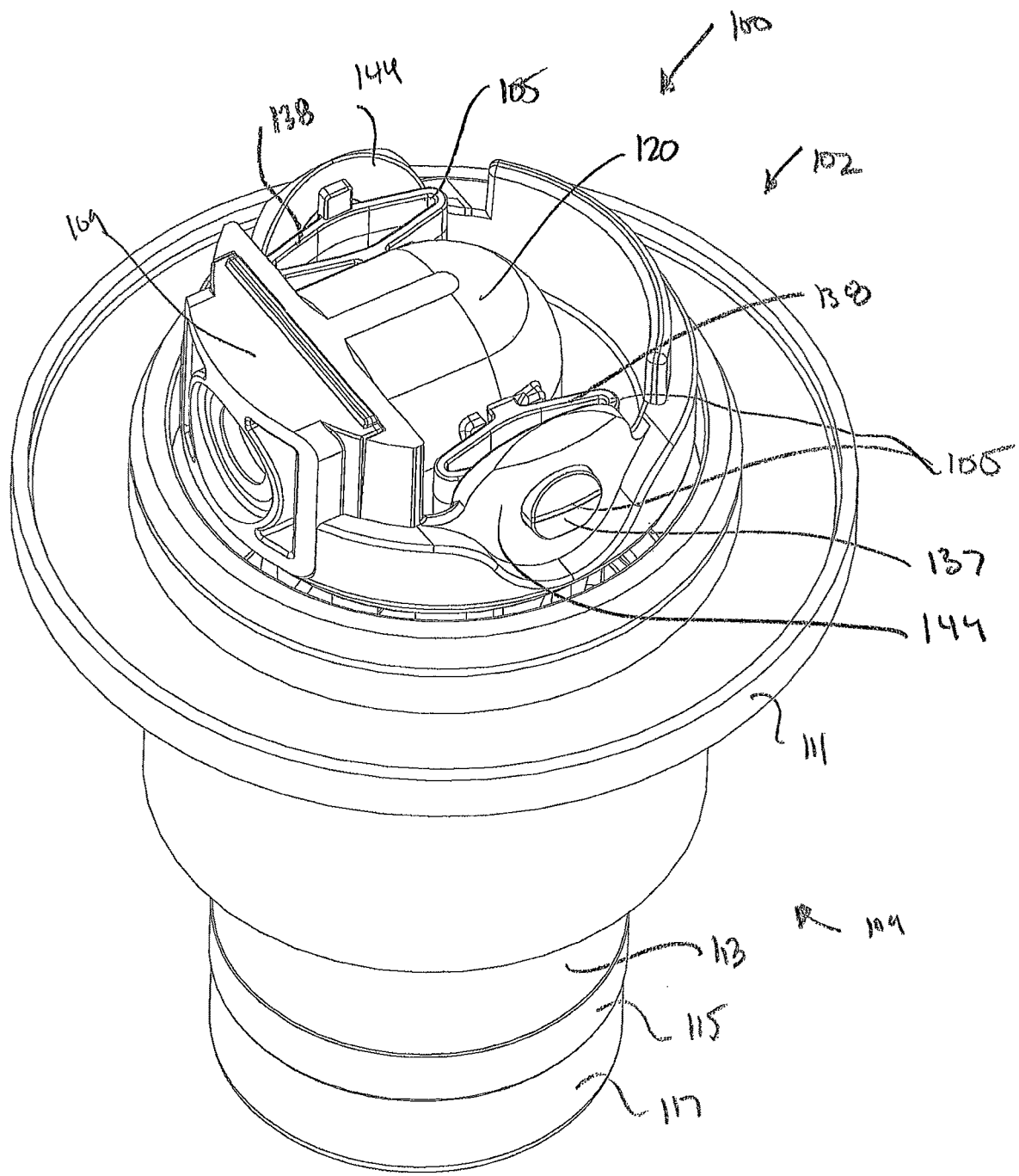
FIG. 3A illustrates a top isometric view of the waterjet apparatus of FIG. 1A with a stem cap removed.
Figure 3B:
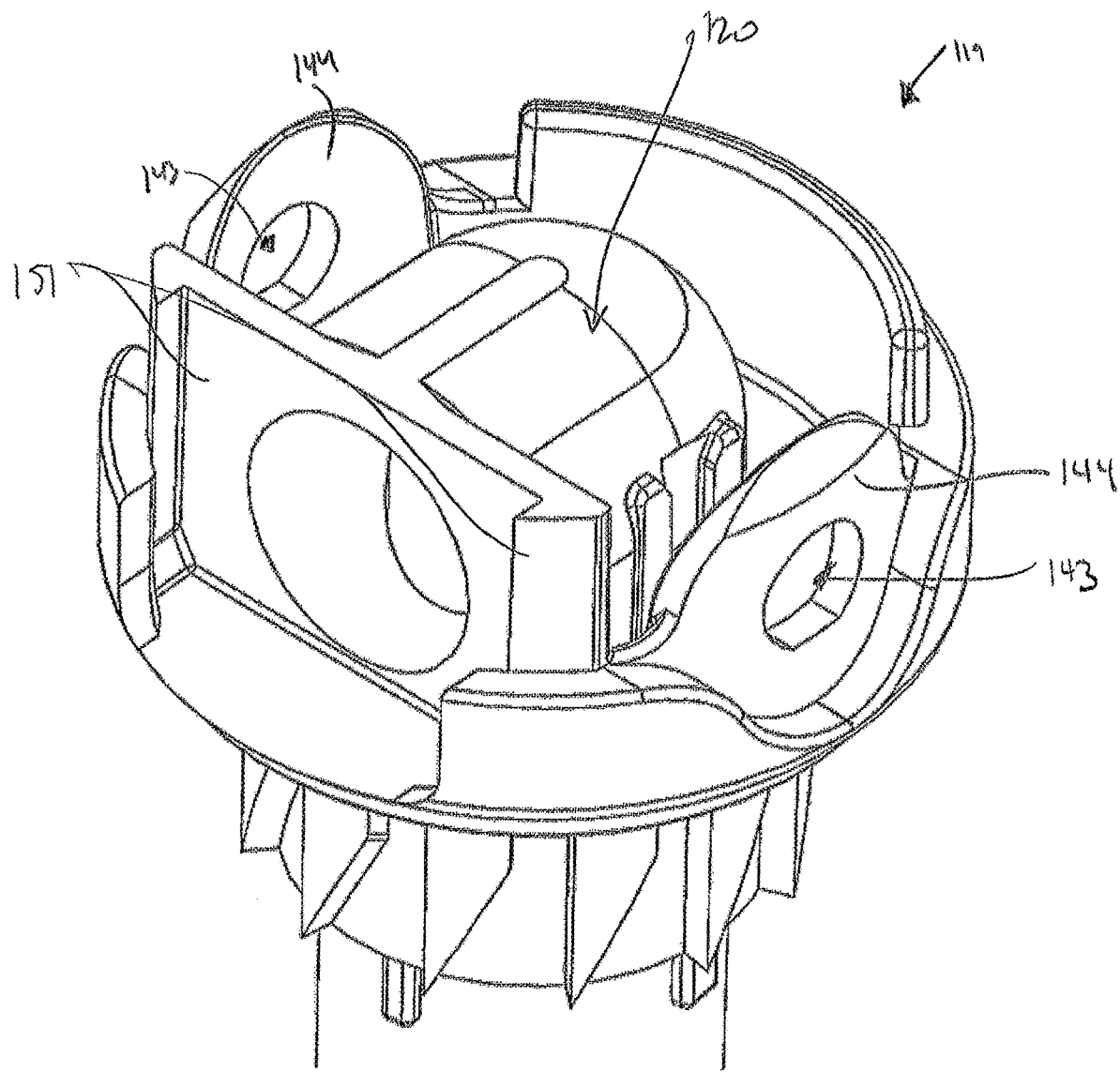
FIG. 3B illustrates a top isometric view of a top portion of an embodiment of a stem of the waterjet apparatus of FIG. 3A.
Figure 3C:
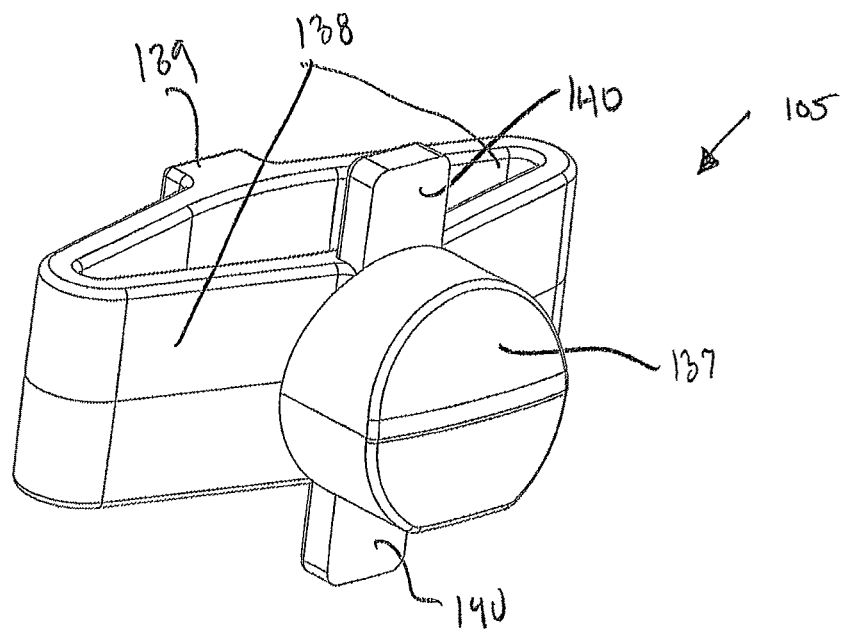
FIG. 3C illustrates an isometric view of an embodiment of a release actuator.

FIG. 3A illustrates a top isometric view of the waterjet apparatus 100 of FIG. 1A with the stem cap 101 removed. With the stem cap removed, two release actuators 105 are visible. The release actuators 105 are shown in greater detail in FIG. 3C. As shown in FIG. 3C, the release actuator 105 includes a button 137 attached to a spring portion 138. The spring portion 138 can be a butterfly spring, as shown, for example. Opposite the button 137, the release actuator 105 includes a protrusion 139 connected to the spring portion 138. The release actuator 105 can also include flanges 140 as shown.

Returning to FIG. 3A, the button 137 of the release actuator extends through an opening 143 (see FIG. 3B) in a flange 144 formed in the stem 119. When the button 137 is pressed, the spring force provided by the spring portion 138 is overcome, and the button moves into the opening 143. The spring portion 138 of the release actuator 105 is positioned in a space between the flange 144 and the exterior of the conduit 120.

Figure 3D:
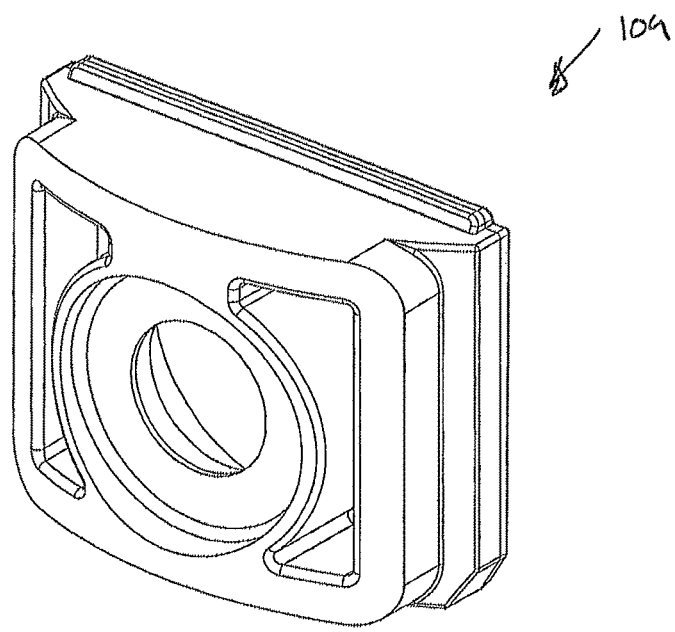
FIG. 3D illustrates an isometric view of an embodiment of a nozzle component.

As shown in FIG. 3A, the removable nozzle 109 is received within grooves 151 (see FIG. 3B) formed on the stem 119. An example removable nozzle 109 is shown in FIG. 3D. As noted previously, any of a plurality of different removable nozzles 109 can be inserted into the grooves 151 of the stem 119 to provide for different flow characteristics.

Figure 4A:
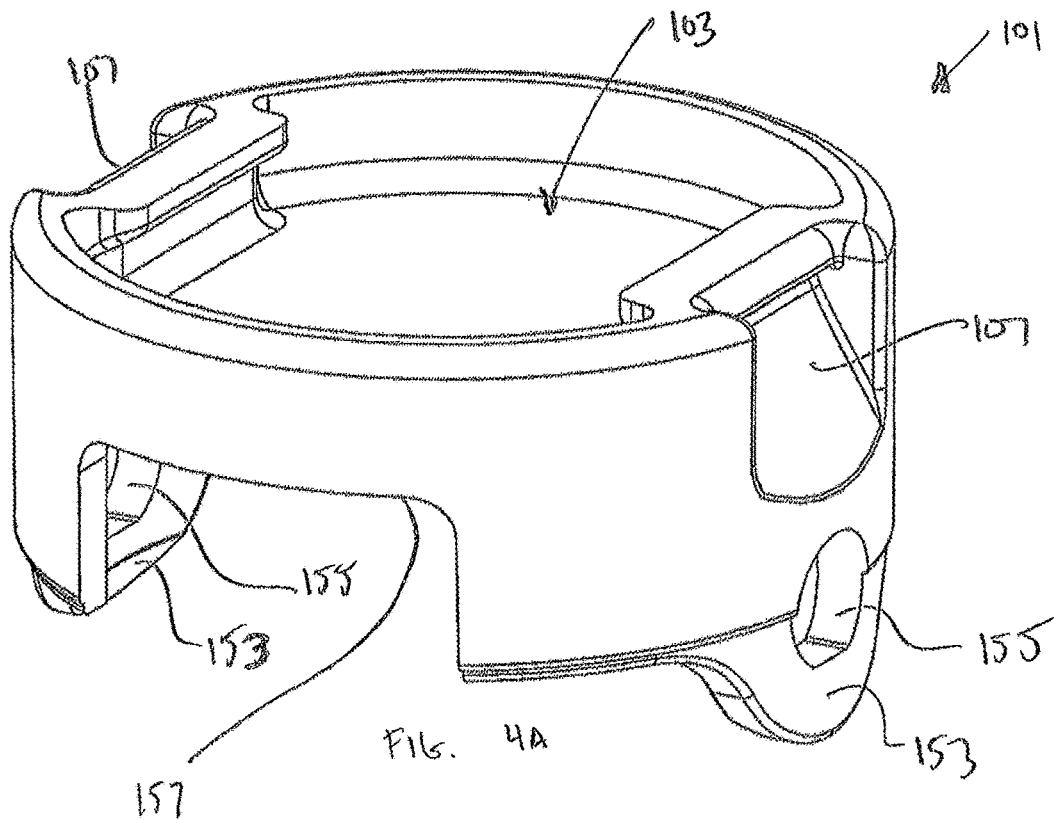
FIG. 4A illustrates a top isometric view of an embodiment of a stem cap.
Figure 4B:
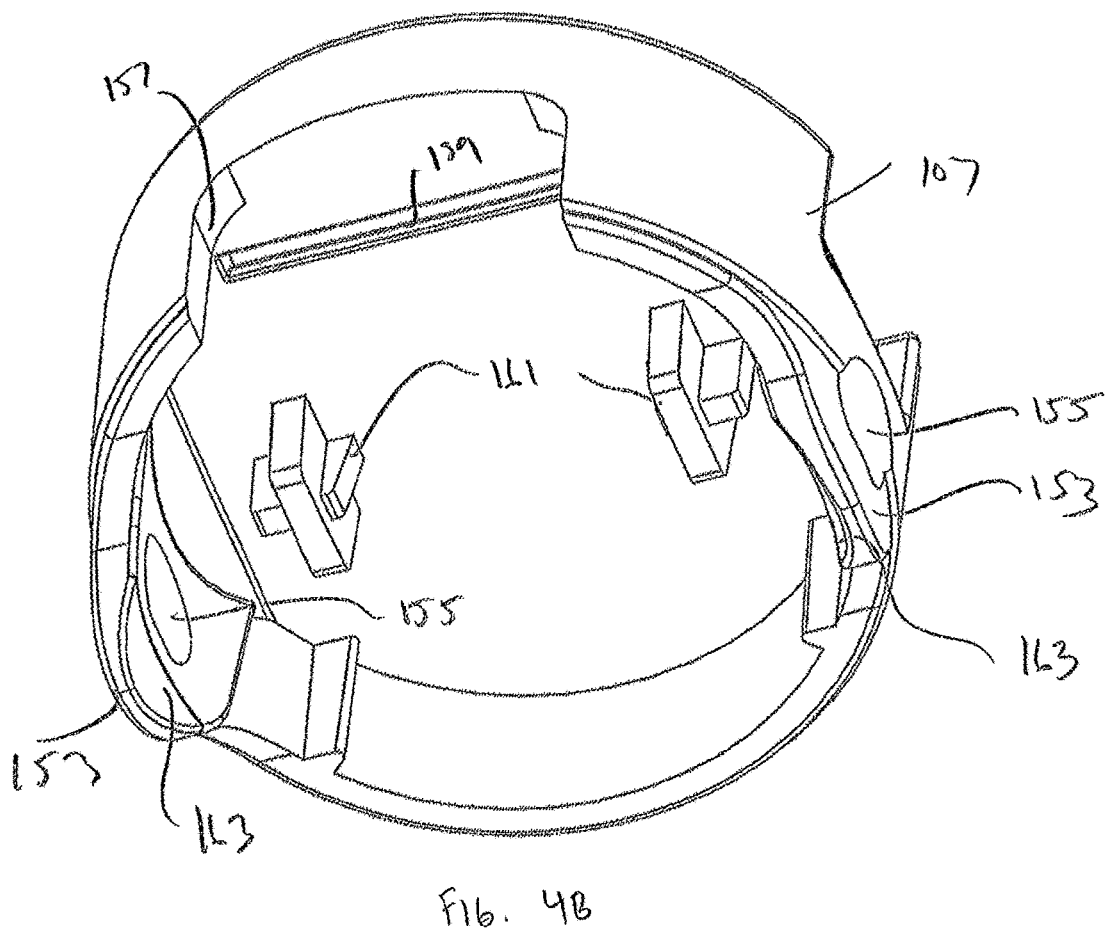
FIG. 4B illustrates a bottom isometric view of the stem cap of FIG. 4A.

FIGS. 4A and 4B illustrates are top and bottom isometric view of an embodiment of a removable stem cap 101 that can be used with the waterjet apparatus 100. As noted previously, the removable stem cap 101 can include a plaster opening 103 configured to receive sufficient plaster so that the upper surface of the waterjet apparatus 100 appears to have a finish comprised of plaster or plaster mixed in with loosely compacted mass of fragments or particles such as pebbles. The removable stem cap 101 also includes engagement features 107 for engaging a removal tool 700 (see FIGS. 7 and 8).

As illustrated, for some embodiments, the removable stem cap 101 includes connection flanges 153 having openings 155. The flanges 153 and openings 155 are used to removably secure the removable stem cap 101 to the stem 119. As shown in the bottom view of FIG. 4B, the interior surfaces of the flanges 153 may include angled portions 163. To secure the removable stem cap 101 to the stem 119, the openings 155 are aligned with the buttons 137 of the release actuators 105 from above or other fasteners or retention devices as discussed herein. The removable stem cap 101 is then pressed onto the stem 119. The angled portions 163 of the flanges 153 push the buttons 137 inwardly allowing the removable stem cap 101 to slide down. When the buttons 137 reach the openings 155, the spring portion 138 causes the buttons 137 to move outwardly into the openings 155, thus securing the removable stem cap 101 in place. The removable stem cap 101 can be removed by pressing the buttons 137 inwardly and removing the removable stem cap 101.

As illustrated, for some embodiments, the removable stem cap 101 also includes a cutout 157 configured to at least partially receive the removable nozzle 109. The removable stem cap 101 can include a groove 159 on its inner top surface that also engages with the removable nozzle 109. The removable stem cap 101 can also include internal projections 161 extending downwardly from the inner top surface. The internal projections 161 may be configured to secure the release actuators 105 in place.

Figure 5:
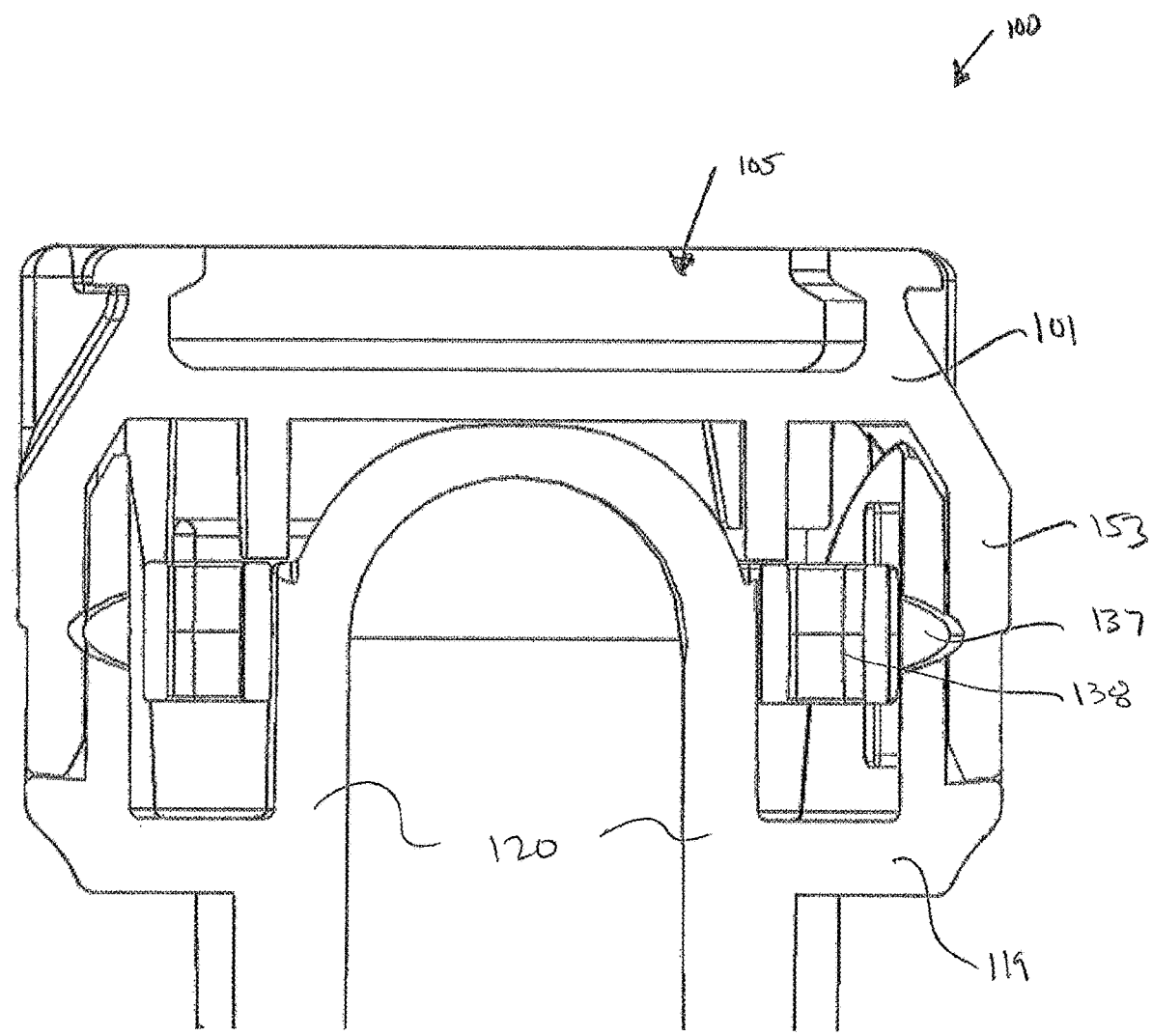
FIG. 5 illustrates a cross-sectional view a top portion of an embodiment of a waterjet apparatus including a removable stem cap.

FIG. 5 illustrates a cross-sectional view a top portion of the waterjet apparatus 100 including the removable stem cap 101.

Figure 6A:
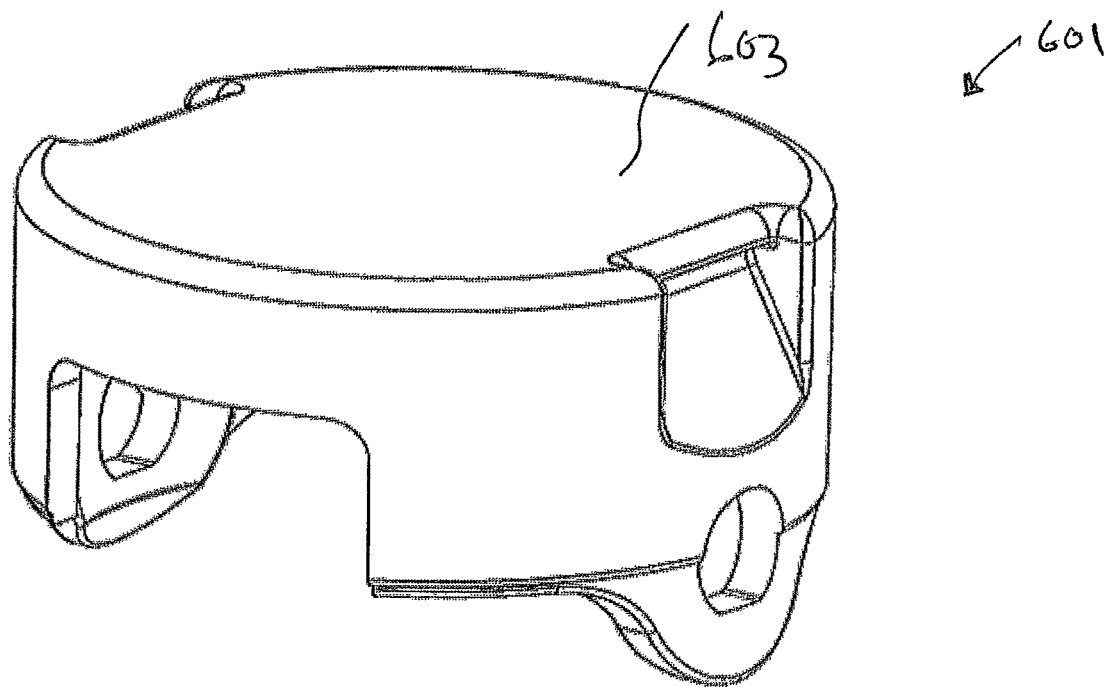
FIG. 6A illustrates a top isometric view of an embodiment of a stem cap.
Figure 6B:
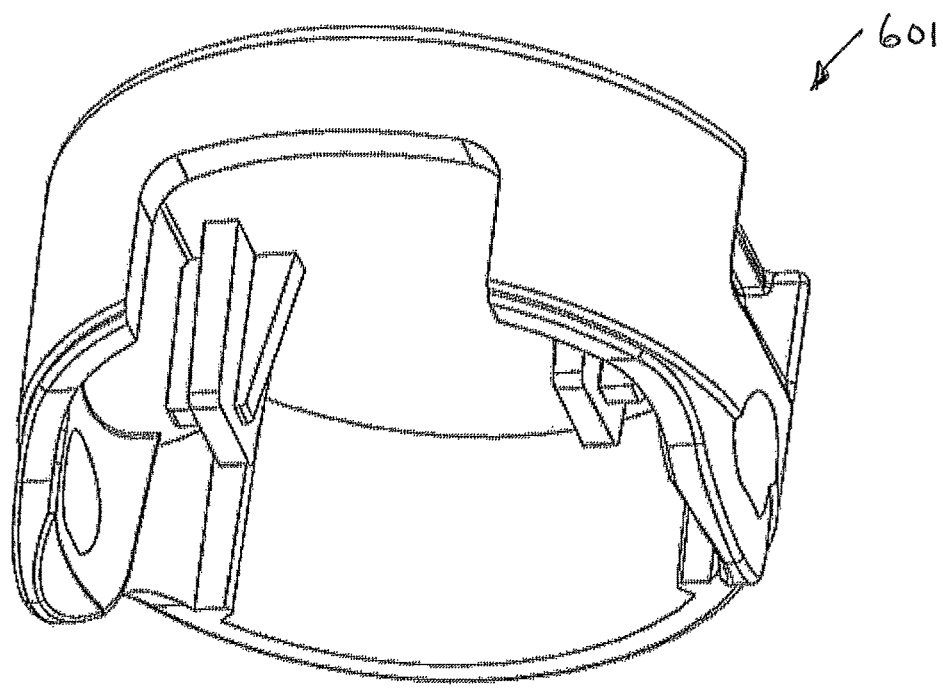
FIG. 6B illustrates a bottom isometric view of the stem cap of FIG. 6A.

FIG. 6A illustrate top and bottom isometric view of another embodiment of a removable stem cap 601. The removable stem cap 601 can be used with the waterjet apparatus 100 described above. The removable stem cap 601 is similar to the removable stem cap 101 described above, except that it does not include plaster opening 103. Instead, removable stem cap 610 includes a flat upper surface 603. The flat upper surface 603 can be configured to mimic the appearance (e.g., color, texture, etc.) of a wall or floor of an artificial body of water or have any other desired color or texture.

Figure 7:
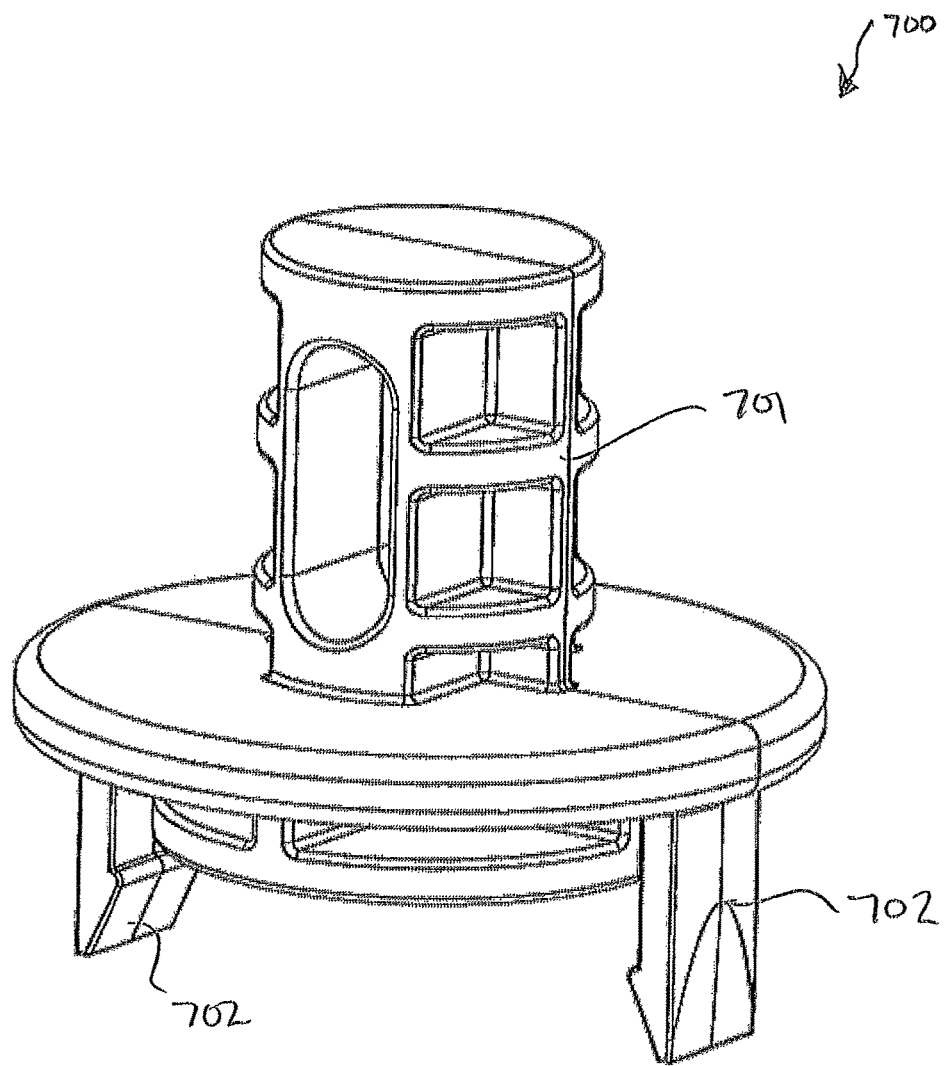
FIG. 7 illustrates a top isometric view of an embodiment of a removal tool for a waterjet apparatus.

FIG. 7 illustrates a top isometric view of an embodiment of a removal tool 700 for a waterjet apparatus. As illustrated, for some embodiments, the removal tool 700 includes a handle 701 and two prongs 702. The prongs are configured in size and shape to selectively engage with the engagement structures 107 on the removable cap 101.

Figure 8:
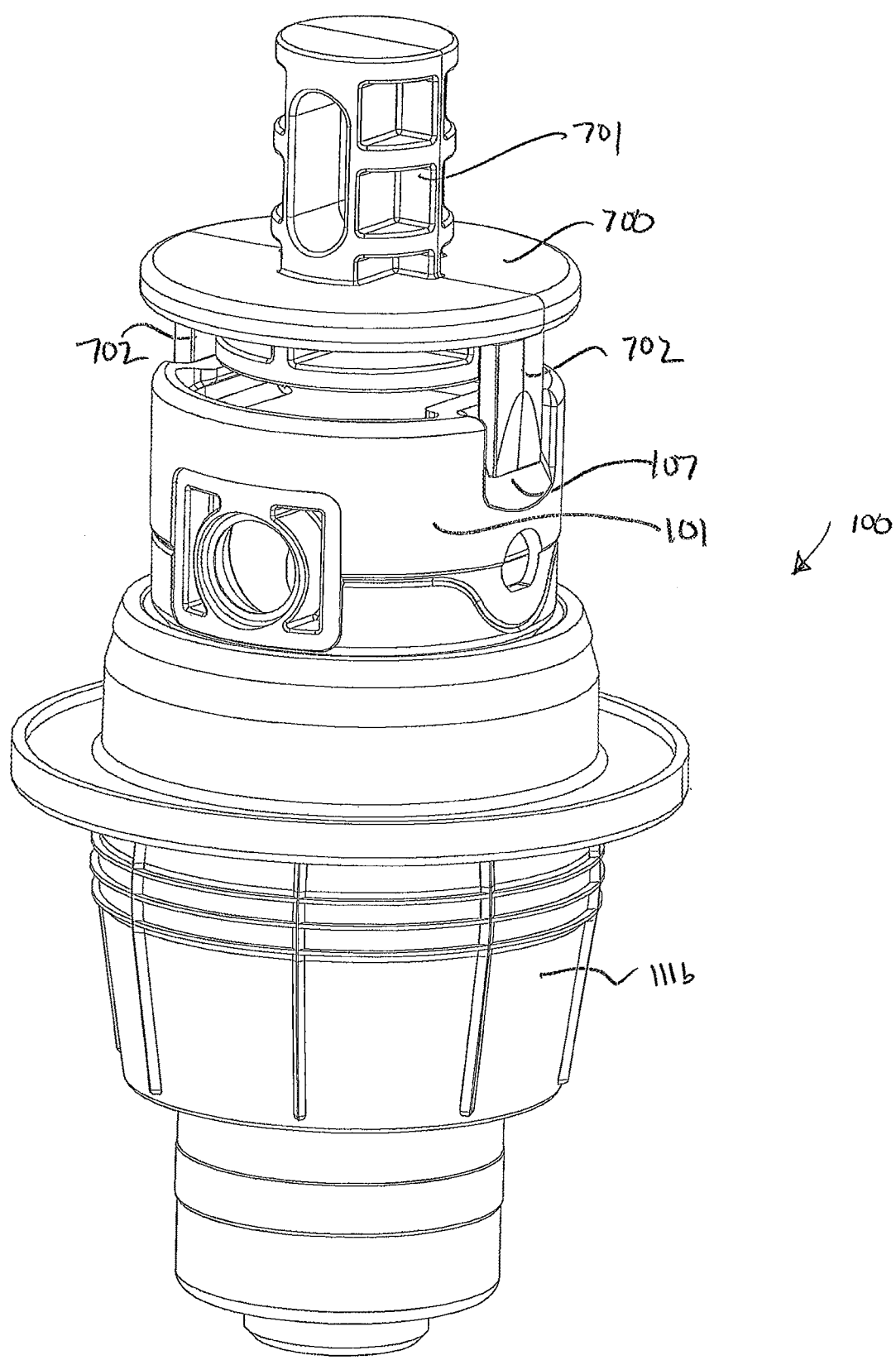
FIG. 8 illustrates a top isometric view that illustrates the removal tool of FIG. 7 engaged with an embodiment of a waterjet apparatus. The waterjet apparatus includes a universal fit pipe flange.

FIG. 8 illustrates a top isometric view that illustrates the removal tool 700 engaged with an embodiment of the waterjet apparatus 100. When engaged, the removal tool 700 can be used to turn the waterjet apparatus 100 to remove it from the floor or wall of an artificial body of water, for example. It can also be used to pull the head 102 up, if desired.

In the embodiment illustrated in FIG. 8, the waterjet apparatus 100 includes a universal fit pipe flange 111b (instead of the pipe fitting 111 shown in FIG. 1A). The universal fit pipe flange 111b includes angled side walls that may allow it to be used on pipes of different angles (relative to the wall or floor of the artificial body of water) or sizes.

Figure 9A:
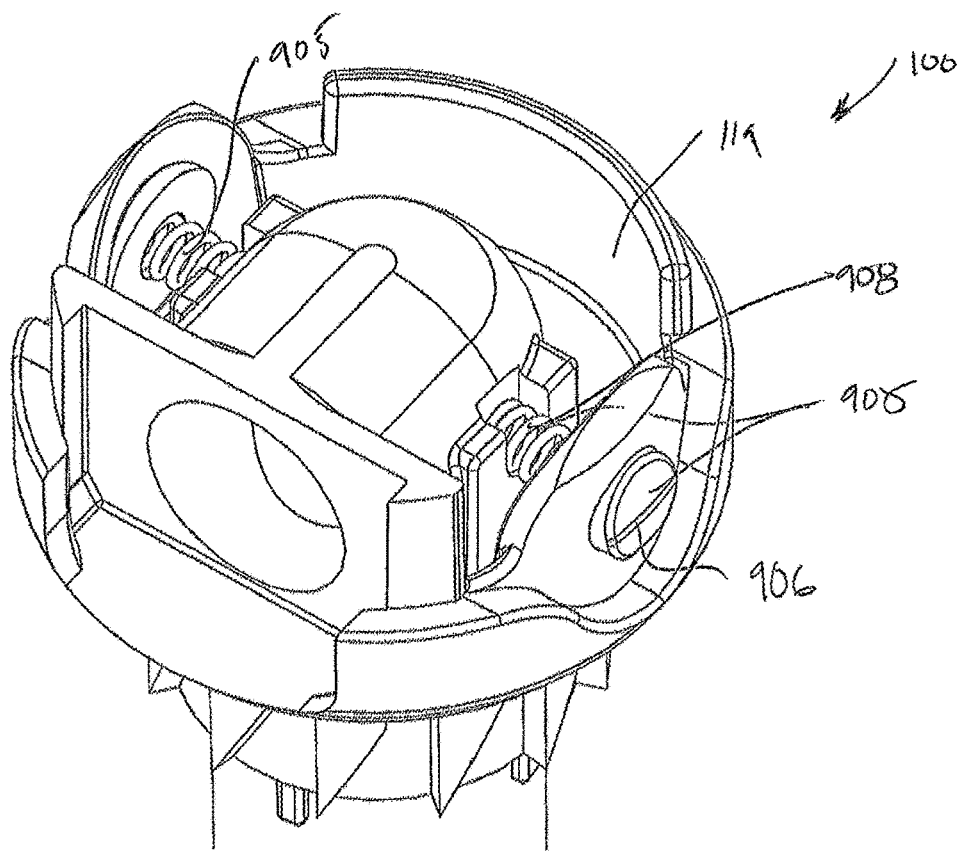
FIG. 9A illustrates a top isometric view of a top portion of another embodiment of a waterjet apparatus with a stem cap removed.
Figure 9B:
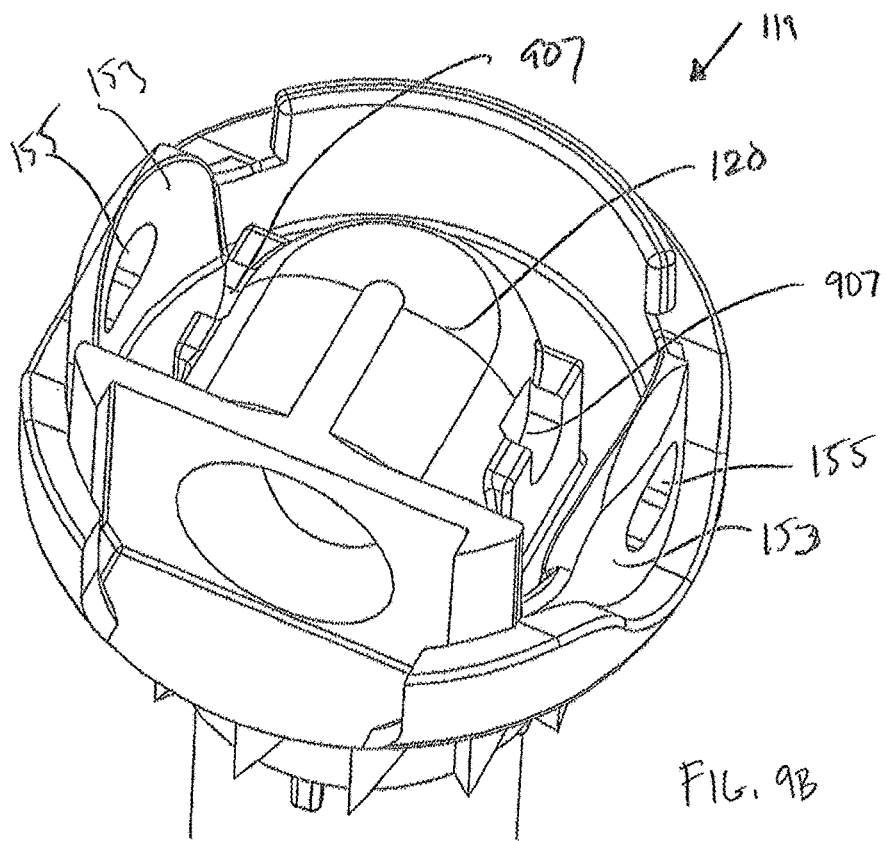
FIG. 9B illustrates a top isometric view of a top portion of a stem of the waterjet apparatus of FIG. 9A.
Figure 9C:
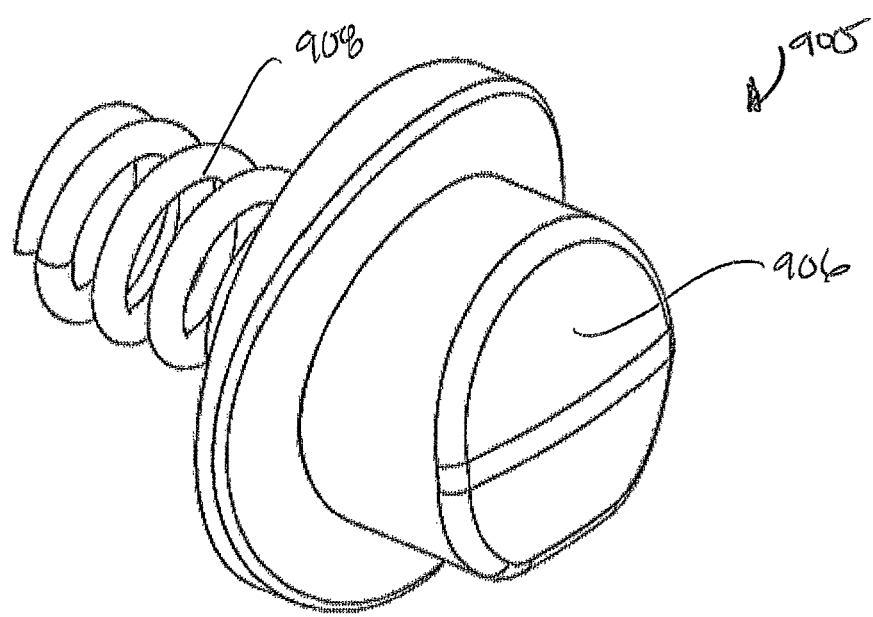
FIGS. 9C and 9D illustrate isometric view of an embodiment of a spring components for the waterjet apparatus of FIG. 9A.
Figure 9D:
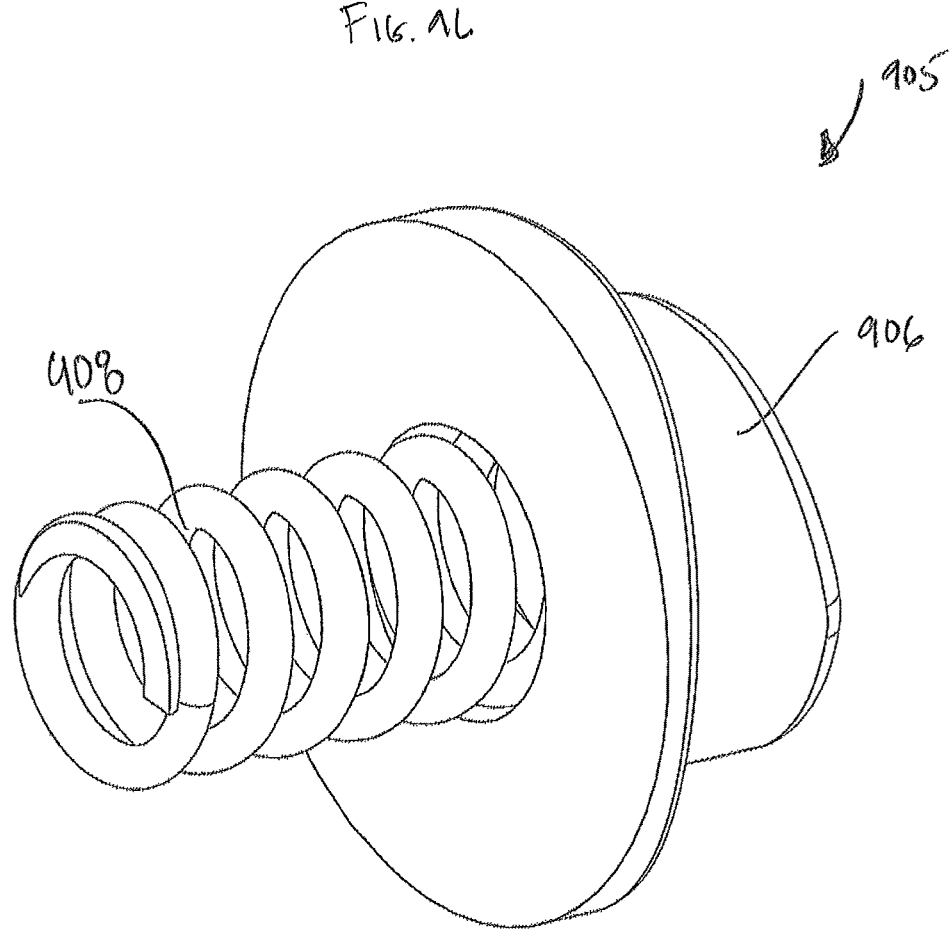
Figure 9E:
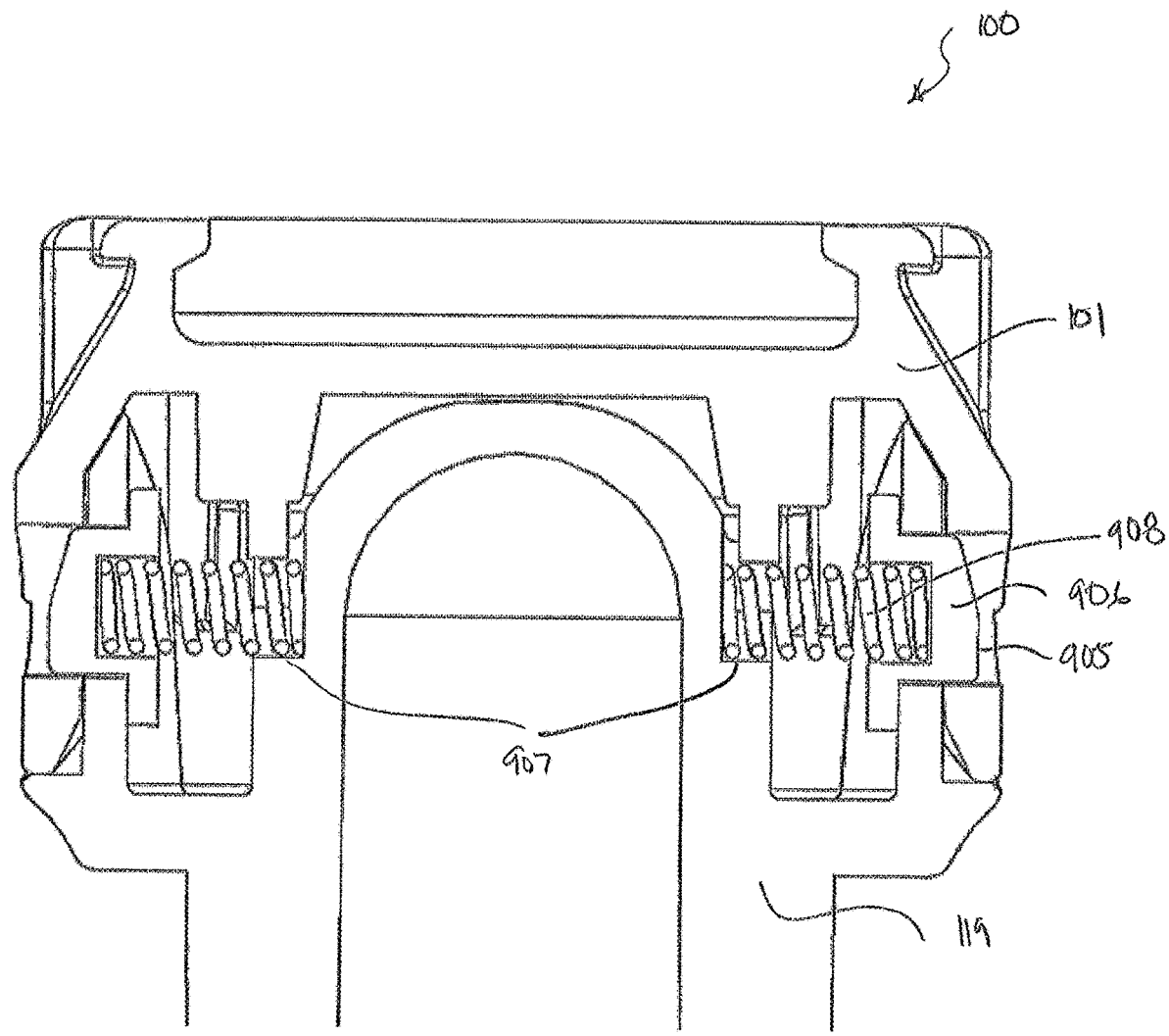
FIG. 9E illustrates a cross-sectional view of the waterjet apparatus of FIG. 9A with the stem cap installed.

FIG. 9A illustrates a top isometric view of a top portion of another embodiment of a waterjet apparatus 100 with the removable stem cap 101 removed. In this embodiment, the release actuator 105 is replaced with release actuator 905. Release actuator 905 includes a button 906 and a coil spring 908, as based shown in FIGS. 9C and 9D, which illustrate isometric views of the release actuator 905. As shown in FIG. 9B, the stem 119 includes recesses 907 that are configured to receive the coil springs 908. FIG. 9E illustrates a cross-sectional view of the waterjet apparatus 100 of FIG. 9A with the removable stem cap 101 installed.

Figure 10A:
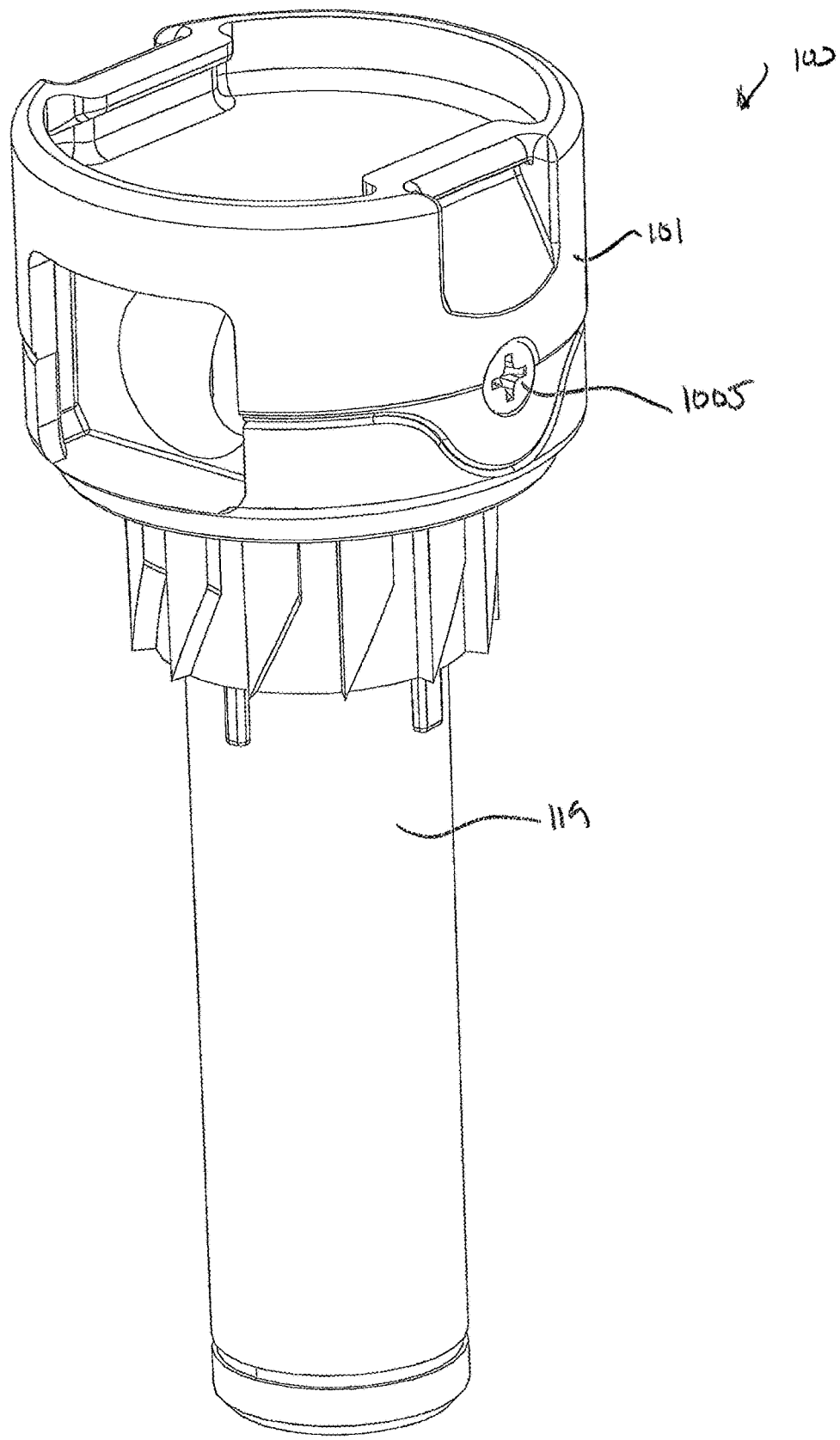
FIG. 10A illustrates a top isometric view of another embodiment of a waterjet apparatus that includes a step cap secured by fasteners.
Figure 10B:
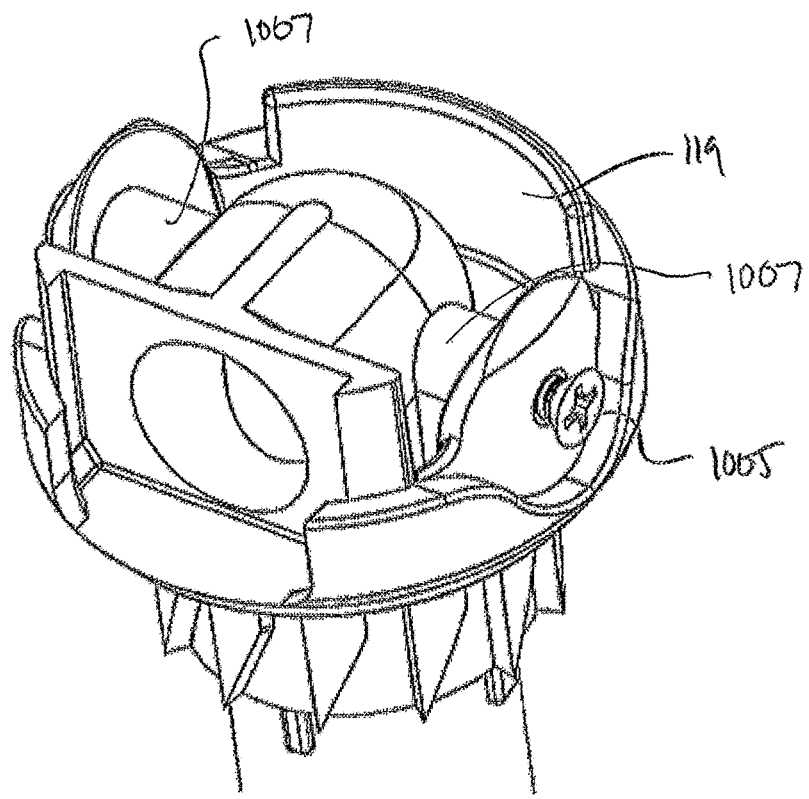
FIG. 10B illustrates a top isometric view of a stem of the waterjet apparatus of FIG. 10A.
Figure 10C:
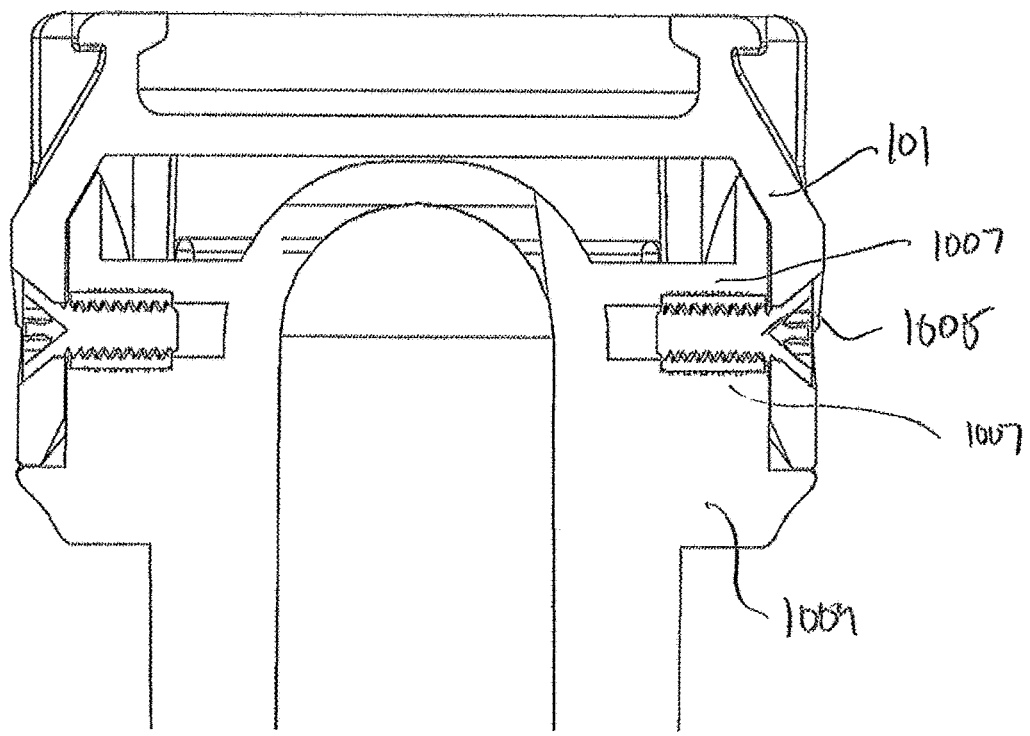
FIG. 10C illustrates a cross-sectional view of the waterjet apparatus of FIG. 10A.

FIG. 10A illustrates a top isometric view of another embodiment of a waterjet apparatus 100 that includes a removable step cap 101 secured by release actuators or fasteners 1005. The fasteners 1005 can be screws or bolts, for example. FIG. 10B illustrates a top isometric view of a stem 119 of the waterjet apparatus 100 of FIG. 10A, with the removable cap 101 removed. The stem 119 includes fastener guides 1007 which receive the fasteners 1005. FIG. 10C illustrates a cross-sectional view of the waterjet apparatus 100 of FIG. 10A.

FIGS. 11A-19 illustrate various views of another embodiment of a waterjet apparatus 200 and various components thereof. In many aspects, the waterjet apparatus 200 may be similar to the waterjet apparatus 100 described above and can include any features of the waterjet apparatus 100 described above. However, the head 202 (see FIG. 11B) of the waterjet apparatus 200 may have a smaller or shorter profile (for example, when measured along a longitudinal axis 20 of the waterjet apparatus 200) than the head 102 of the waterjet apparatus 100 (see, for example, FIG. 1A). In some embodiments, this may allow an overall length of the waterjet apparatus 200 (measured along the longitudinal axis 20) to be shorter than an overall length of the waterjet apparatus 100. In some embodiments, this may allow the waterjet apparatus 200 to have a similar size and/or profile as conventional or previously known waterjet apparatuses such that the waterjet apparatus 200 can simply and easily be installed in place of a conventional waterjet apparatus (in some embodiments, without requiring any modification of the surface (e.g., wall or floor) or opening of the surface of the body of water into which the waterjet apparatus 200 is installed). That is, in some embodiments, a conventional waterjet apparatus can be removed and the waterjet apparatus 200 can be installed in place thereof. In some embodiments, the waterjet apparatus 100 can also similarly be installed in place of a conventional waterjet apparatus. Further, features of the waterjet apparatus 200 may be combined with or substituted for features of the waterjet apparatus 100 discussed above, and vice versa.

Figure 11B:
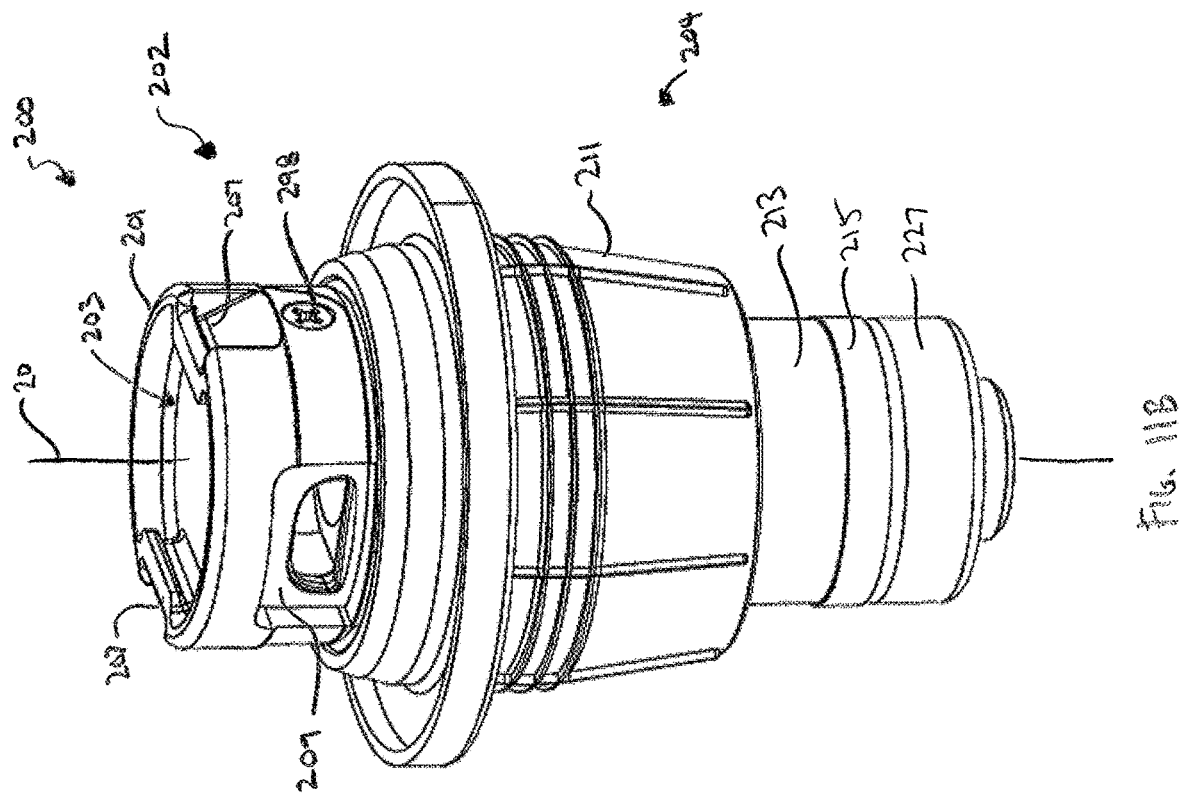
FIG. 11B illustrates a top isometric view of the waterjet apparatus of FIG. 11A with the stem in the extended position.
Figure 11A:
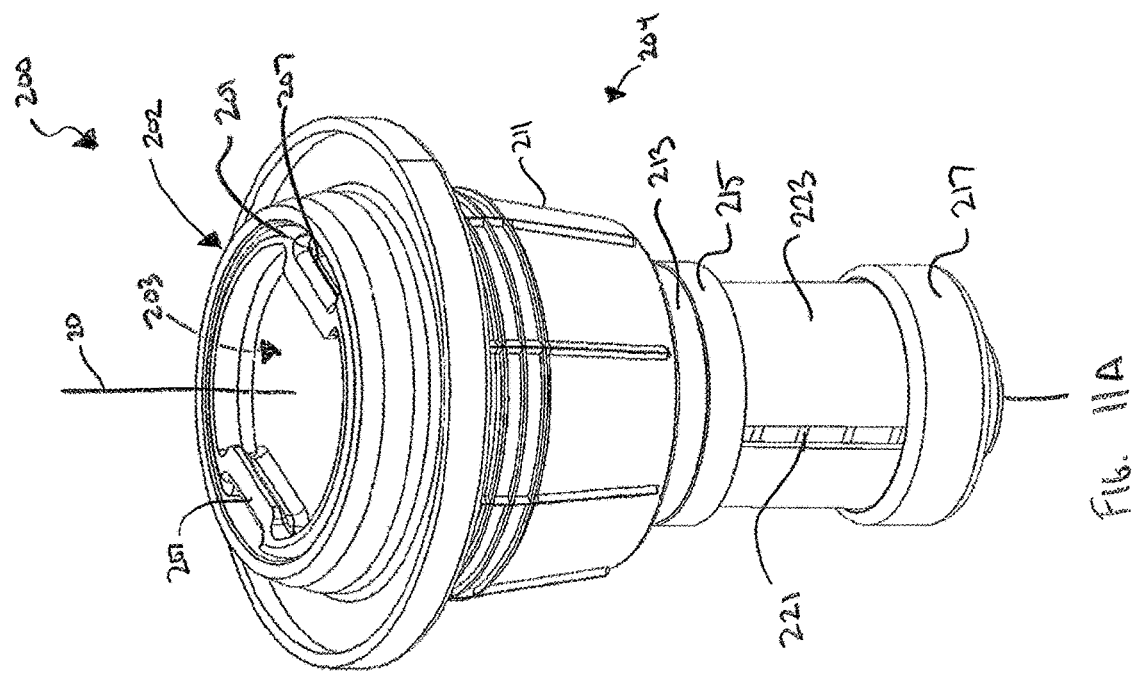
FIG. 11A illustrates a top isometric view of another embodiment of a waterjet apparatus with the stem in a retracted position

FIG. 11A illustrates a top isometric view of the waterjet apparatus 200 with the stem 219 (not visible in FIG. 11, but shown in the cross-sectional view of FIGS. 12A and 12B, as well as in the views of FIGS. 13A-14C) and head 202 in a retracted position. FIG. 11B illustrates a top isometric view of the waterjet apparatus 200 with the stem 219 and head 202 in the extended position. Similar to the waterjet apparatus 100 discussed above, the waterjet apparatus 200 is configured to be installed in the floor or wall of a body of water as part of a cleaning system. The waterjet apparatus 200 is configured to be alternatingly or intermittently supplied with a source of pressurized water. The pressurized water causes the stem 219 and head 202 to pop up (i.e., move from the retracted position of FIG. 11A to the extended position of FIG. 11B). In the extended position, the pressurized water exits the waterjet apparatus 200 through the nozzle 209. The stream of water exiting the nozzle 209 cleans the wall or floor of the body of water into which the waterjet apparatus 200 is installed. Similar to the waterjet apparatus 100, the waterjet apparatus 200 is configured to rotate slightly each time the stem 219 and head 202 extend and/or retract. This allows the position of the nozzle and stream of water to vary.

The waterjet apparatus 200 includes a removable stem cap 201. As illustrated, for some embodiments, the removable stem cap 201 includes a plaster opening 203. The plaster opening 203 can be a recess formed in a top surface of the removable stem cap 201. In some embodiments, the plaster opening 203 is configured to house, retain, contain, support, engage and/or allow attachment of plaster, cement, grout, mortar, sand, binder, pebble, rocks, aggregate material and/or a surface finish. The plaster opening 203 is sized to receive sufficient plaster so that the upper surface of the waterjet apparatus 200 appears to have a finish comprised of plaster or plaster mixed in with loosely compacted mass of fragments or particles such as pebbles. In some embodiments, the plaster opening 203 may accommodate vinyl.

The removable stem cap 201 includes engagement features 207 similar to the engagement features 107 described above. The engagement features 207 can be configured to engage with a corresponding removal tool, for example, the removal tool 700 illustrated in FIG. 7.

As illustrated, for some embodiments, the removable stem cap 201 is secured to the stem 219 by fasteners 298 as shown in FIG. 11B. The fasteners 298 can be screws or bolts, for example. In some embodiments, the removable stem cap 201 can be secured to the stem 219 with other methods, for example the release actuators 105, 905 described above. For example, in some embodiments, a release actuator can comprise a button which secures the removable stem cap 201 to the waterjet apparatus 200, and which when actuated (e.g., pressed), allows the removable stem cap 201 to be removed from the waterjet apparatus 200.

As illustrated, for some embodiments, the waterjet apparatus 200 includes a removable nozzle 209. As will be discussed below, in some embodiments, when the removable stem cap 201 is removed, the removable nozzle 209 can also be removed and replaced with a different removable nozzle 209. Thus, the waterjet apparatus 200 can use a plurality of interchangeable removable nozzles 209. This may allow user to select a particular removable nozzle 209 to achieve a desired flow characteristic, such as depending on the size of the orifice of the removable nozzle 209 that allows for water flow out of the removable nozzle 109. In some embodiments, the nozzle 209 of the waterjet apparatus 200 has an oblong or oval shaped opening as shown, although other shapes of the opening of the nozzle 209 are possible. Several example nozzles 209 are shown in FIGS. 17A-18B and discussed below.

As illustrated in FIGS. 11A and 11B, the waterjet apparatus 200 includes a housing 204, which may be similar to the housing 104 discussed above. The housing 204 includes a pipe fitting 211, an actuation collar 213, a spring actuation ring 215, a spring actuation stop 217, and a guide member 223. Each of these may be similar to similar or corresponding features of the waterjet apparatus 100 and will not be described again in detail. The pipe fitting 211 can be a universal pipe fitting, similar to the pipe fitting 111b described above, or it can be a standard pipe fitting, similar to the pipe fitting 111 described above (see FIG. 1A).

FIGS. 12A and 12B illustrate cross-sectional views of the waterjet apparatus 200 with the stem 219 and head 202 in the retracted and extended positions, respectively. As shown, in the illustrated embodiment, the removable stem cap 201 is removably attached to a top portion of a stem 219 by fasteners 298.

As illustrated, for some embodiments, an interior portion of the waterjet apparatus 200 includes a conduit 220 that is defined within the stem 219. When pressurized water is supplied to the waterjet apparatus 200, it flows through the conduit 220 in the direction of arrows 222 as shown in FIG. 12B. In some embodiments, the interior of the conduit 220 can be substantially smooth to minimize turbulent flow. As illustrated, for some embodiments, the conduit 220 includes a bend 220a (such as a 90-degree bend, although other angles are possible), which redirects the flow of the water. As illustrated, for some embodiments, the bend 220a redirects the water such that it flows in a direction out of the page (relative to the orientation shown in FIG. 12B). In some embodiments, the bend 220a can be rounded, smooth, and/or gradual, as seen, for example, in FIG. 13C. The bend 220a can be configured to minimize turbulent flow and/or produce other desirable flow characteristics. As illustrated, the conduit 220 and the bend 220a can form a continuous path to the removable nozzle 209 substantially without water leakage to, for example, the removable stem cap 201.

The pipe fitting 211 can be configured to mount the waterjet apparatus 200 into the floor or wall of an artificial body of water. The actuation collar 213 can be configured to interact with the stem 219 and the guide member 223 to allow for rotation of the stem 219 and head 202 each time the stem 219 and head 202 pop. A spring 221 is positioned between the spring actuation ring 215 and the spring actuation stop 217. As illustrated, for some embodiments of FIG. 12A (with the stem 219 and head 202 popped up), the spring 221 is in an expanded state. In the expanded state, the spring 221 pushes the stem 219 and head 202 down relative to the body 204. When pressurized water is supplied to the waterjet apparatus 2, the pressure overcomes the force of the spring 221, compressing it as the stem 219 and head 202 pop up (as shown in FIG. 12B).

Figure 13A:
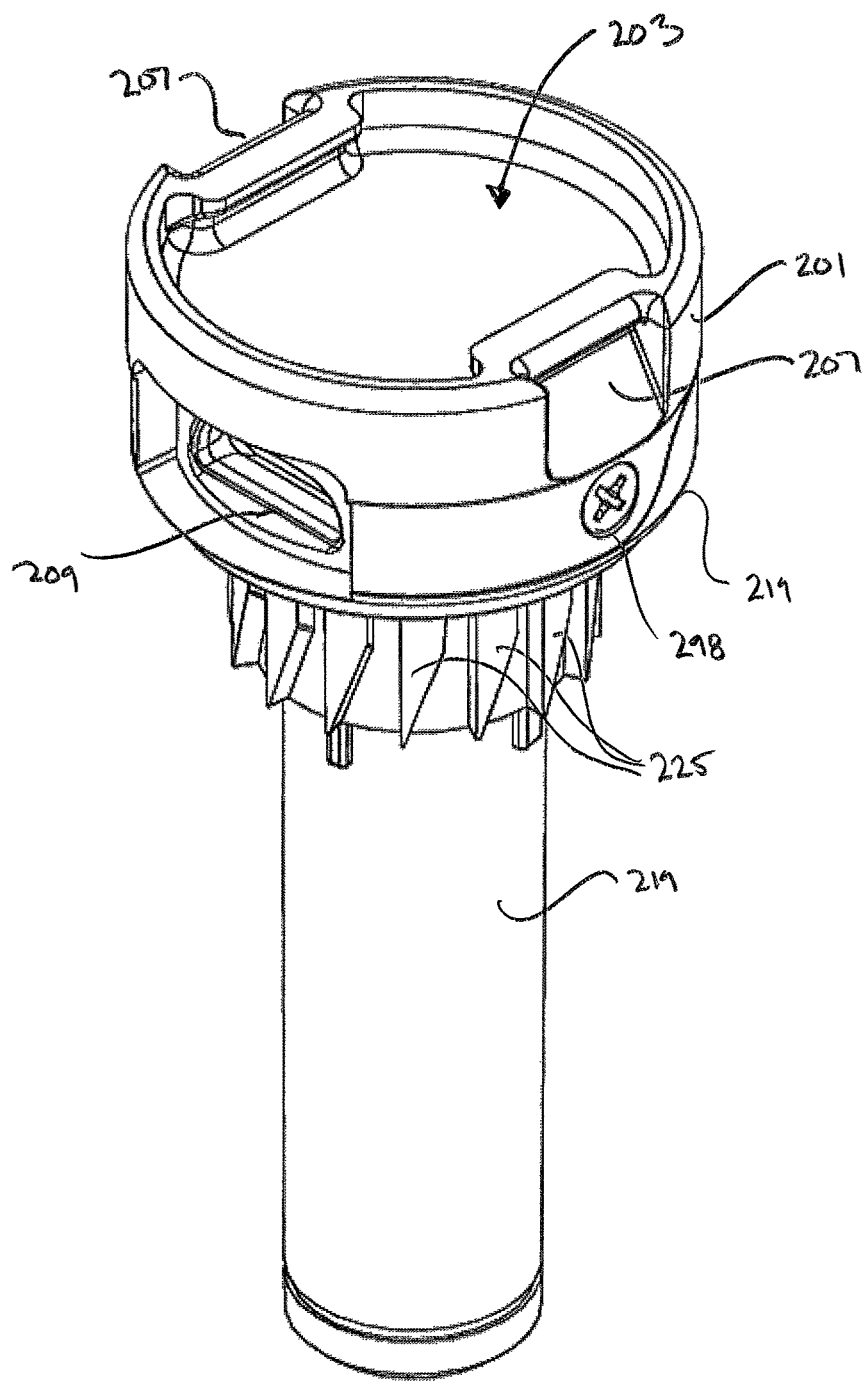
FIG. 13A illustrates an isometric view of an embodiment of the stem, stem cap, and nozzle of the waterjet apparatus of FIG. 11A in an assembled configuration.
Figure 13D:
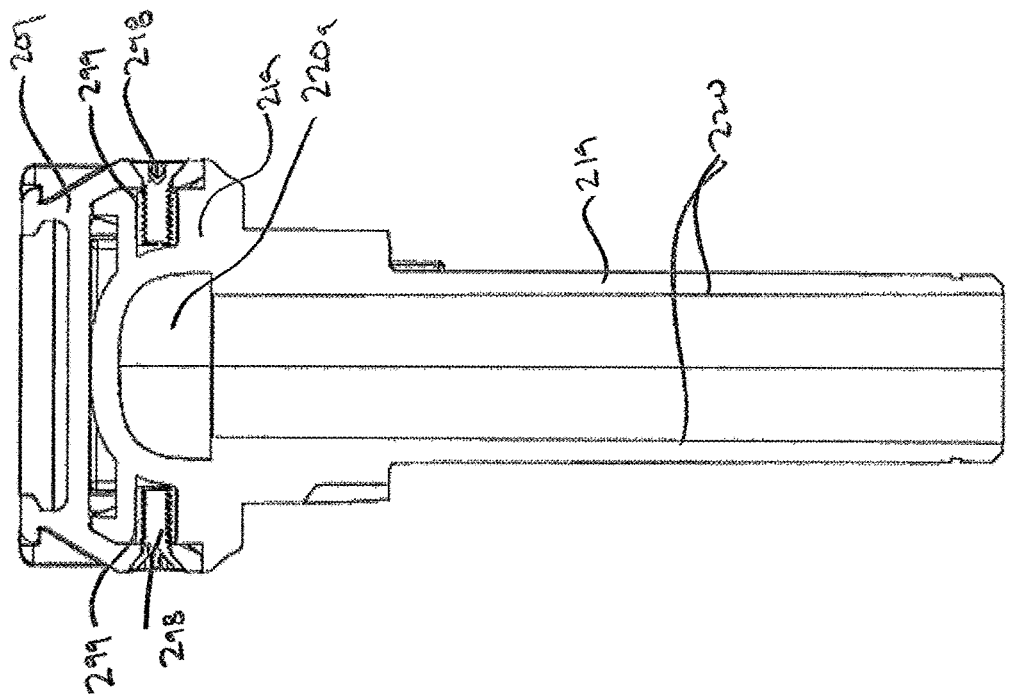
FIG. 13D illustrates a second cross-sectional view of the stem, stem cap, and nozzle of FIG. 13A.
Figure 13C:
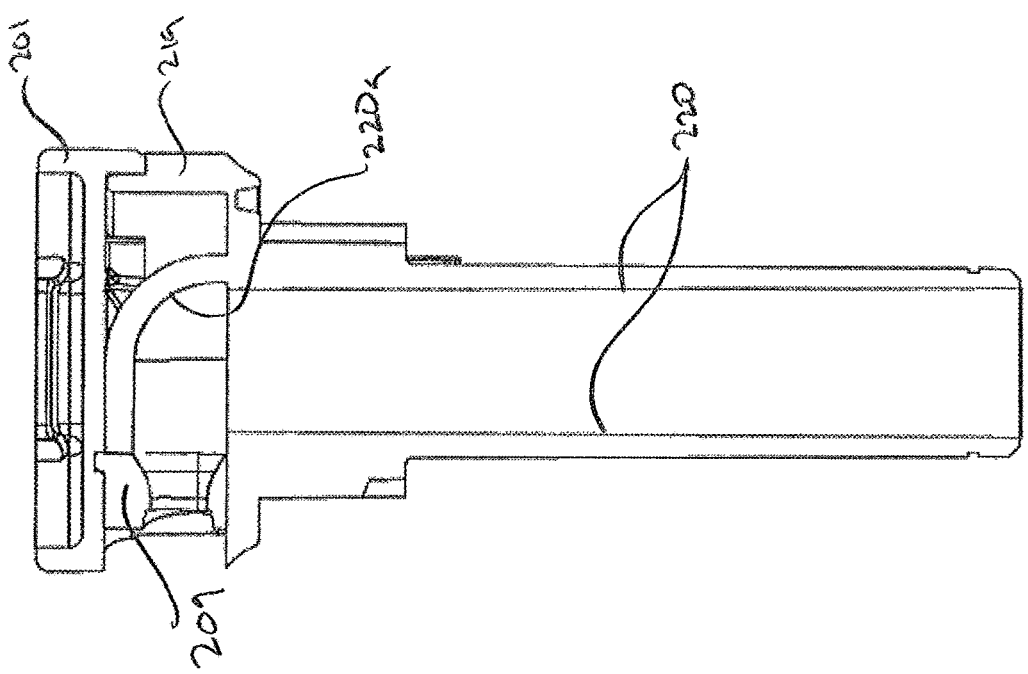
FIG. 13C illustrates a first cross-sectional view of the stem, stem cap, and nozzle of FIG. 13A.

FIGS. 13A-13D illustrate various views of an embodiment of the stem 219, the removable stem cap 201, and the nozzle 209 of the waterjet apparatus 200 removed from the body 204. FIG. 13A is an isometric view of the components in an assembled configuration. FIG. 13B is an exploded view of the components. FIGS. 13C and 13D are first and second cross-sectional views, respectively.

As shown in FIG. 13A, the removable stem cap 201 is assembled on top of the stem 219 and secured by fasteners 298. The fasteners 298 extend radially through the removable stem cap 201 and into the stem 219. As also shown in FIG. 13A, the nozzle 209 is received between the removable stem cap 201 and the stem 219. The nozzle 209 is recessed inwardly from the outer radial edges of the removable stem cap 201 and the stem 219, as compared with the position of the nozzle 109 in the waterjet apparatus 200 (compare for example, the position of the nozzle 209 of FIG. 13A with the position of the nozzle 109 in FIG. 1A). Also illustrated in FIG. 13A, the stem 219 can include teeth 225 (similar to teeth 125) which interact with corresponding features of the body 204 to cause the stem 219 and head 202 to rotate as the stem 219 and head 202 pop up and down as described above. The stem 219 can have between 12 to 20 teeth 225, including 14 to 18, including 15, 16, or 17 teeth 225, including the foregoing values. The number of teeth 225 can determine an extent of rotation of the stem 219 and head 202 made with each intermittent application of water pressure. Greater number of teeth 225 will result in a relatively smaller rotation about the center axis 20. Smaller number of teeth 225 will result in a relatively larger rotation about the center axis 20. Desired extent of rotation can be balanced with robustness of the teeth 225 where the smaller number of teeth 225, the more robust the teeth 225 may be, necessitating in reduced maintenance.

As shown in the exploded view of FIG. 13B, the removable stem cap 201 includes openings 281 configured to receive the fasteners 298 therethrough. The openings 281 can be positioned on flanges 253 of the removable stem cap 201. In some embodiments, the flanges 253 extend downwardly from the body of the removable stem cap 201 and wrap around the removable stem cap 201 toward a cutout 257 on the front of the removable stem cap 201. In some embodiments, the flanges 253 are not positioned on a rear portion of the removable stem cap 201. The flanges 253 mate with a corresponding recessed portion 284 on the stem 219 when the removable cap 201 is installed thereon. In some embodiments, the shape of the flanges 253 and the shape of the recessed portion 284 can be configured to correspond such that the removable cap 201 can only be installed on the stem 219 in a single orientation.

The cutout 257 of the removable cap 201 is configured to receive at least a portion of the nozzle 209. In some embodiments, the cutout 257 is formed through the flanges 253 on the front of the removable cap 201. In some embodiments, the cutout 247 also extends at least partially into the body of the removable stem cap 201.

Figure 19:
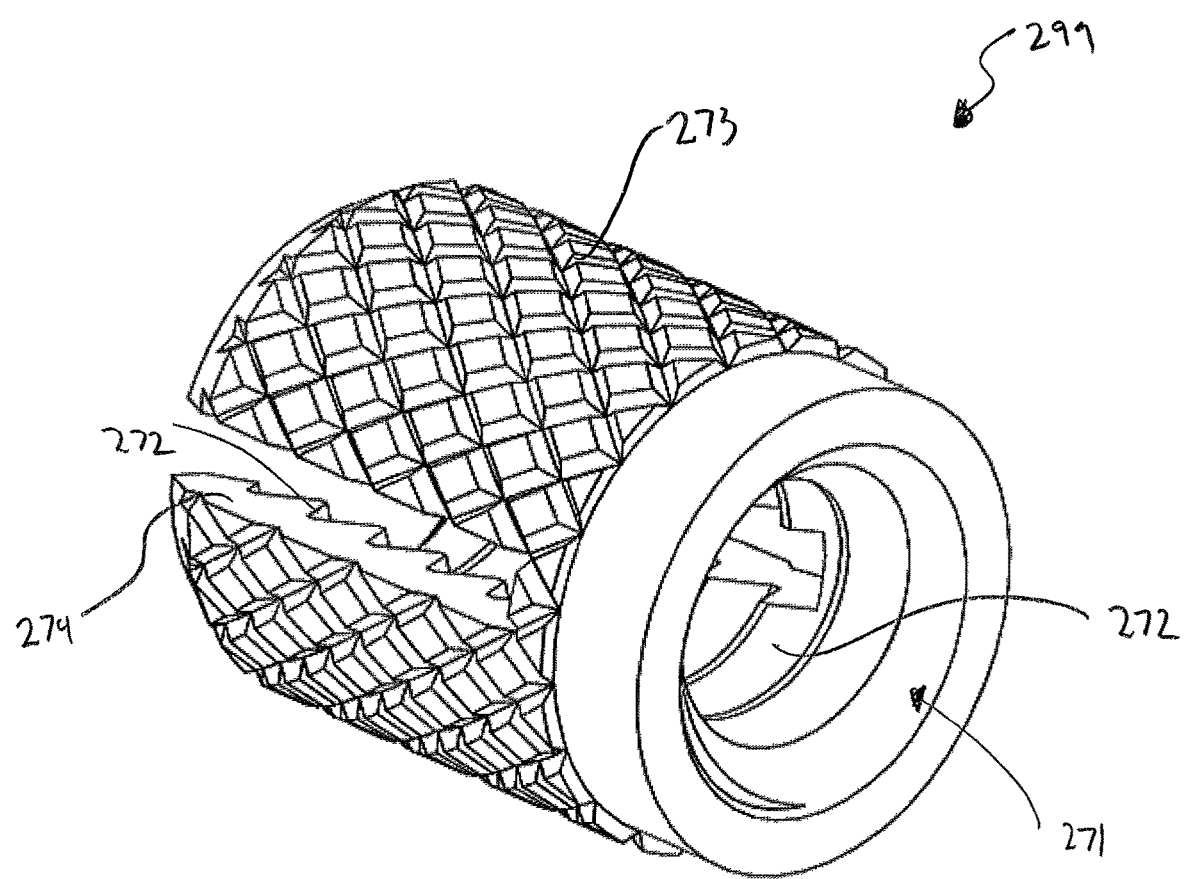
FIG. 19 illustrates an isometric view of an embodiment of a threaded insert for the waterjet apparatus of FIG. 11A.

The stem 219 also includes opening 283 configured to receive the fasteners 298. When the removable stem cap 201 is installed on the stem 219 the openings 283 of the stem 219 are aligned with the openings 281 of the removable stem cap 201. In some embodiments, internally threaded inserts 299 are press fit (or otherwise installed) into the openings 283 to receive threaded ends of the fasteners 298. An example insert 299 is shown in FIG. 19 and described below. In some embodiments, the inserts 299 are omitted and the fasteners 298 can engage with the stem 219 directly.

As illustrated, for some embodiments, the stem 219 includes a surface 251 bounded by flanges 252 that is configured in size and shape to receive a back portion of the nozzle 209. For example, the nozzle 209 can be positioned with a back surface of the nozzle 209 placed against the surface 251 of the stem 219 between the flanges 252. When the removable stem cap 201 is installed over the nozzle 209 and the stem 219, the nozzle 209 is secured between the stem 219 and the removable stem cap 201. The surface 251 includes an opening 254 that is connected to the bend 220a and the channel 220, such that pressurized water can be directed through the stem 219 to the nozzle 209. In some embodiments, the opening 254 is oblong (for example, extending longer in a circumferential direction than in an axial direction). In some embodiments, a lower edge of the opening 254 is straight or flat and an upper edge of the opening 254 is curved. Several example nozzles 209 are shown in FIGS. 17A-18B and described below.

FIGS. 13C and 13D are first and second cross-sectional views, respectively. The first cross-sectional view of FIG. 13C is taken along a longitudinal plane that bisects the nozzle 209. This view illustrates the flow path through the stem 219, including the channel 220, bend 220a, and nozzle 209. The second cross-sectional view of FIG. 13D is taken along a longitudinal plane that bisects the fasteners 298. This view illustrates the fasteners 298 extending through removable stem cap 201 and into the stem 219 to secure the removable stem cap 201 to the stem 219.

Figures 14A, 14B:
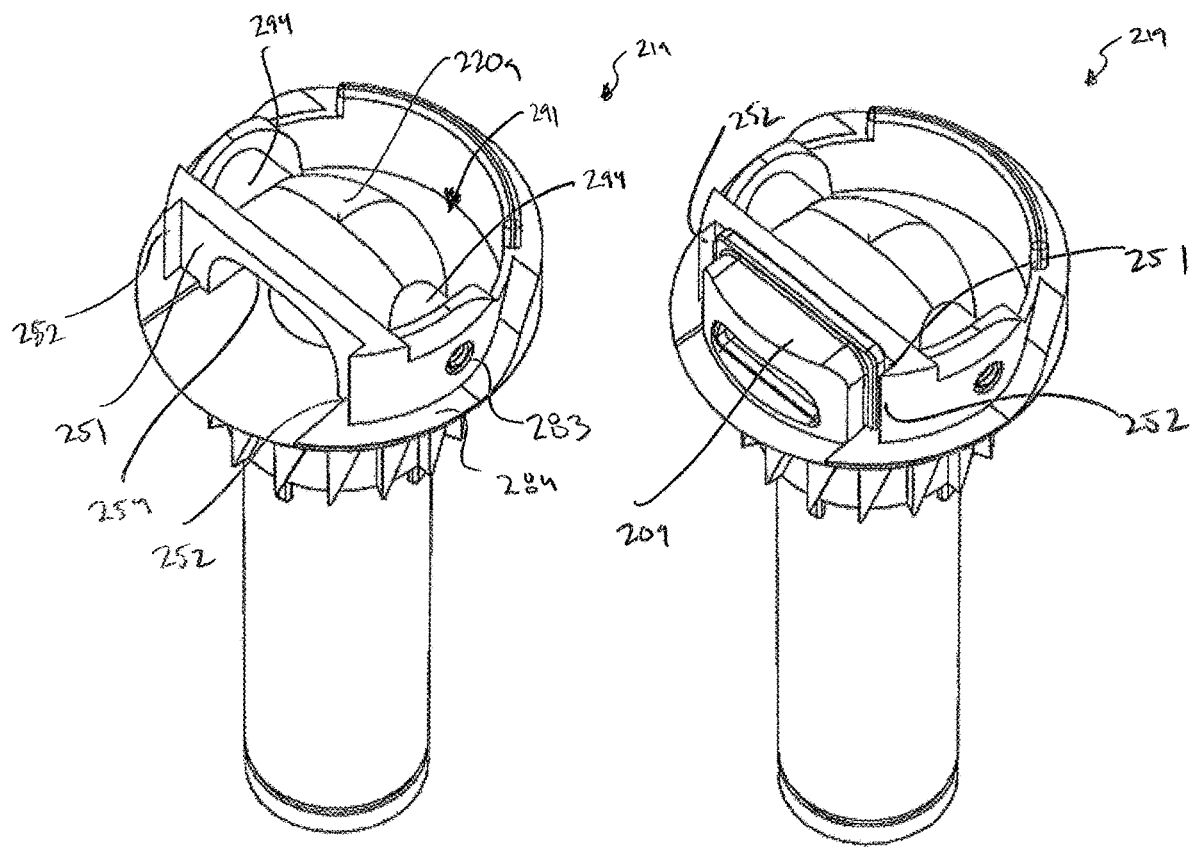
FIG. 14A illustrates an isometric view of an embodiment of the stem of the waterjet apparatus of FIG. 11A.
FIG. 14B illustrates an isometric view of the stem of FIG. 14A with an embodiment of a nozzle installed.

FIG. 14A illustrates an isometric view of an embodiment of the stem 219 of the waterjet apparatus 200. In addition to the features previously described, FIG. 14A illustrates extensions 294 which extend radially from the exterior of the bend 220a to the openings 283. The openings 283 are formed through the extensions 294 and configured to receive the fasteners 298 and/or inserts 299. An empty space or void 291 may be formed within the head of the stem 219 behind the bend 220a. In some embodiments, the void 291 is included to increase the ease of manufacturing of the stem 219. For example, in some embodiments, the stem 219 may be injection molded and it may be desirable that the features of the stem 219 have a substantially uniform thickness. Thus, the void 291 may be included such that the stem 219 need not be excessively think in the region behind the bend 220a.

FIG. 14B illustrates an isometric view of the stem 219 with an embodiment of a nozzle 209 installed thereon. As previously described, the nozzle 209 is positioned against the surface 251 of the stem 219 between the flanges 252. In the waterjet apparatus 200, the stem 219 does not wrap around the front of the nozzle 209 as with the waterjet apparatus 100. For example, in the waterjet apparatus 200, the nozzle 209 can be installed by sliding the nozzle 209 in a radial direction towards the surface 251 or by sliding the nozzle 209 down along an axle direction along the surface 251. In contrast, because flanges of stem 119 the waterjet apparatus 100 wrap partially around the nozzle 109, the nozzle 109 can only be installed by sliding the nozzle 109 downwardly in an axial direction in the waterjet apparatus 100. In some embodiments, the configuration of the waterjet apparatus 200 may be easier to manufacture and/or require a less complex mold when compared with that of the waterjet apparatus 100. For example, narrow metal pins that are used to form the wrap around flanges of the stem 119 are not required in the mold for the stem 219.

Figure 14C:
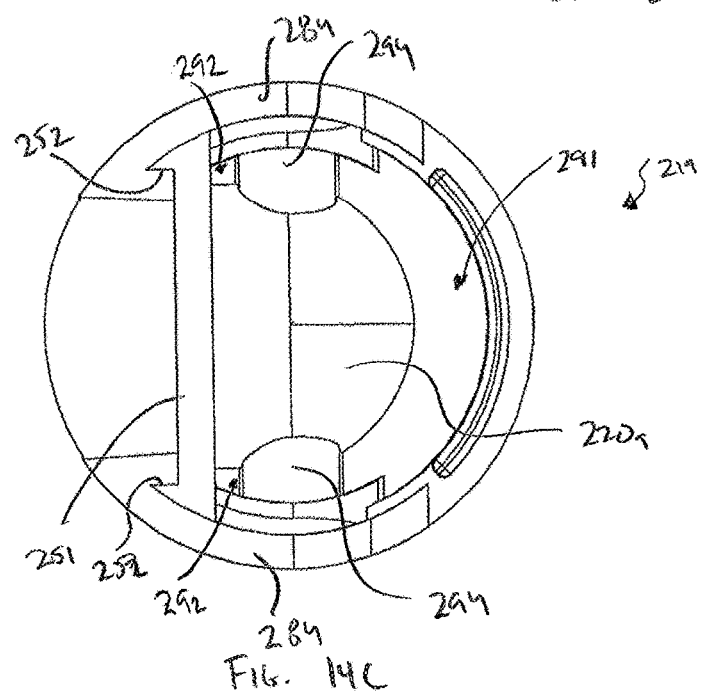
FIG. 14C illustrates a top view of the stem of FIG. 14A.

FIG. 14C illustrates a top view of the stem 219. In addition to the features previously described, additional voids 292 are shown positioned between the extensions 294 and the features of the stem 219 which form the surface 251 and flanges 252. These voids 292 may be included for similar reasons as the void 291 previously described, namely, in an effort to create features of uniform thickness for ease of manufacture.

Figure 15A:
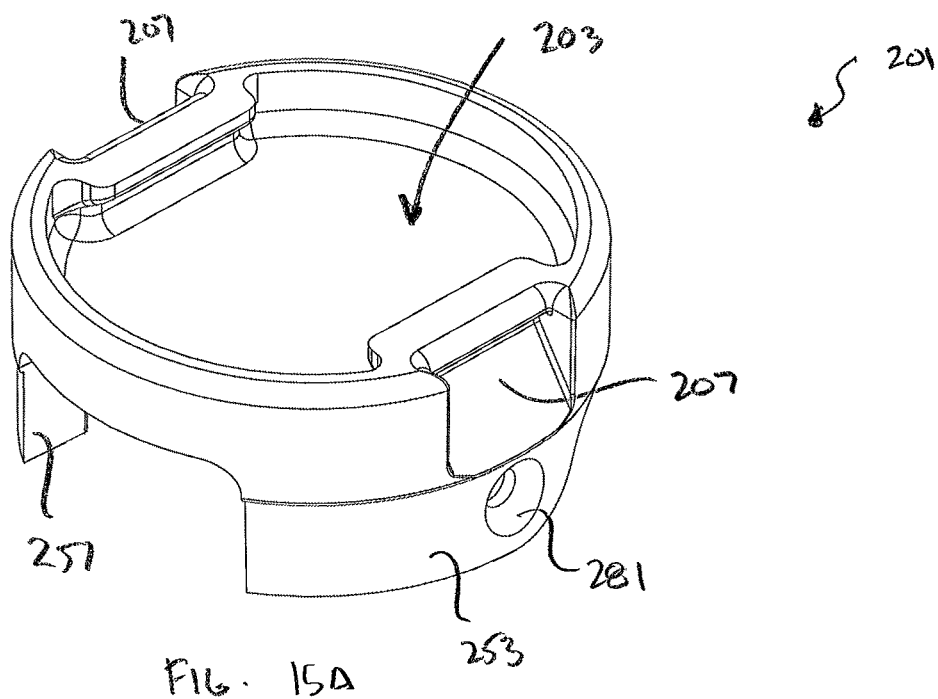
FIG. 15A illustrates a top isometric view of an embodiment of the stem cap of the waterjet apparatus of FIG. 11A.
Figure 15B:
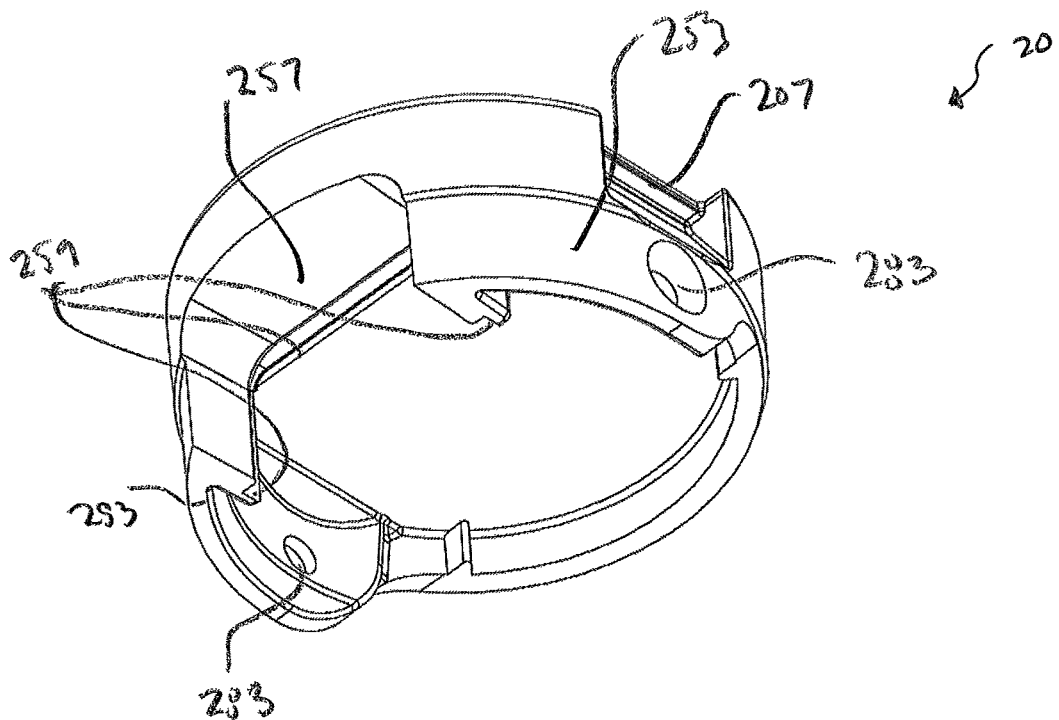
FIG. 15B illustrates a bottom isometric view of the stem cap of FIG. 15A.

FIGS. 15A and 15B illustrate top and bottom isometric views of an embodiment of the removable stem cap 201. In addition to the features previously described, FIG. 15B illustrates grooves 259 positioned on the interior of the removable stem cap 201 and configured to receive or be positioned against flanges 212 (see FIGS. 17A-18B) of the nozzle 209 to retain the nozzle 209 in a desired position. In some embodiments, the grooves 259 are positioned around the cutout 257.

Figure 16A:
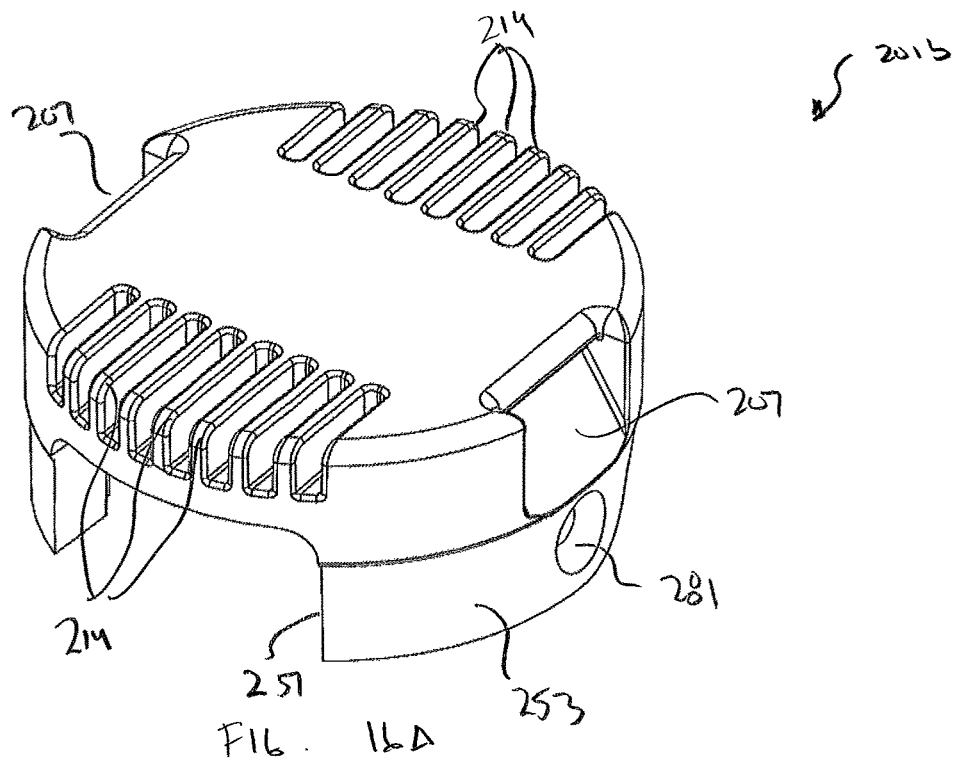
FIG. 16A illustrates a top isometric view of another embodiment for a stem cap for the waterjet apparatus of FIG. 11A.
Figure 16B:
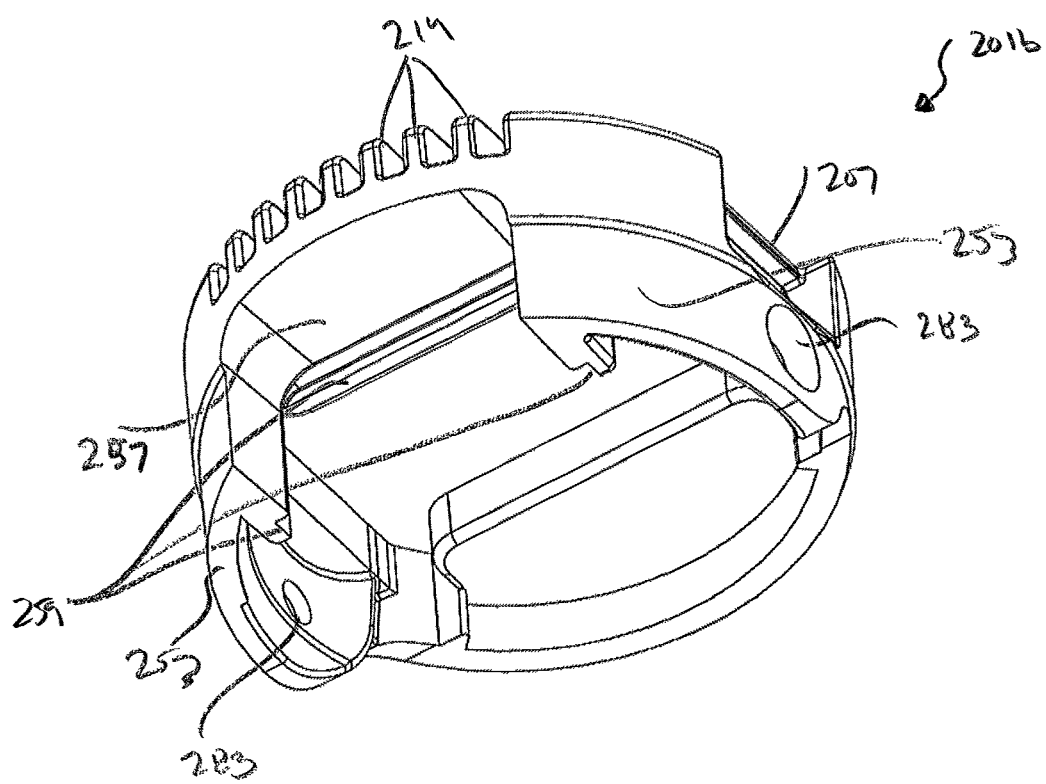
FIG. 16B illustrates a bottom isometric view of the stem cap of FIG. 16A.

FIGS. 16A and 16B illustrates top and bottom isometric views of another embodiment of a removable stem cap 201b for the waterjet apparatus 200. The removable stem cap 201b is similar in many respects to the removable stem cap 201 previously described, except that it does not include a plaster opening 203. Rather, it includes a generally flat upper surface. Additionally, the removable stem cap 201b includes fins 214. In some embodiments, the fins 214 are positioned and configured to facilitate manufacture of the removable stem cap 201b. For example, the fins 214 can be positioned on portions of the removable stem cap 201b that would otherwise be excessively thick. By inclusion of the fins 214, the features of the removable stem cap 201b can all have a substantially similar thickness.

Figure 17A:
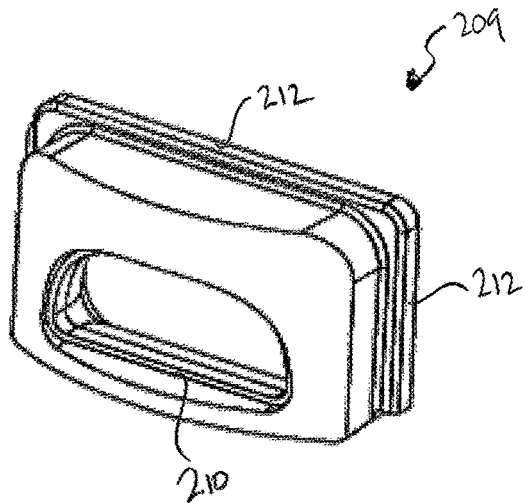
FIG. 17A illustrates an isometric view of an embodiment of the nozzle of the waterjet apparatus of FIG. 11A.
Figure 17B:
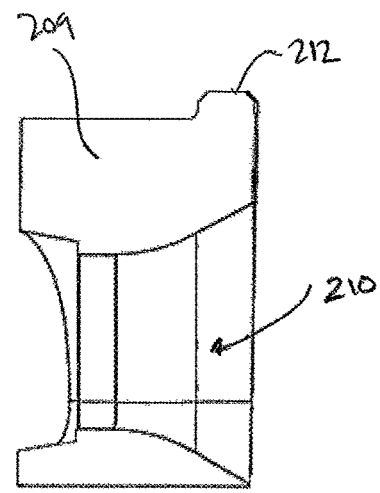
FIG. 17B illustrates a cross-sectional view of the nozzle of FIG. 17A.

FIG. 17A illustrates an isometric view of an embodiment of the nozzle 209. As shown, the nozzle 209 includes a nozzle opening 210 extending therethrough. The nozzle opening 210 may comprise an oblong or oval shape (as compared with the circular nozzle opening of the nozzle 109). The nozzle 209 also includes flanges 212 configured to be received by the grooves 259 of the removable stem cap 201. FIG. 17B illustrates a cross-sectional view of the nozzle 209. As shown, the cross-section of the nozzle opening 210 reduces from the back to the front of the nozzle 209. Thus, the nozzle 209 is a flow reducer.

Figure 18A:
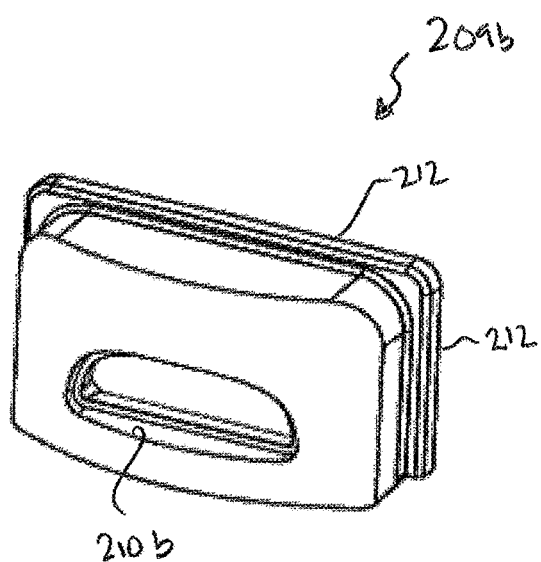
FIG. 18A illustrates an isometric view of another embodiment of a nozzle for the waterjet apparatus of FIG. 11A.
Figure 18B:
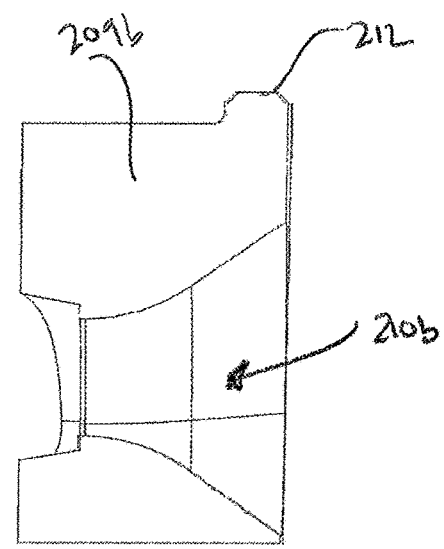
FIG. 18B illustrates a cross-sectional view of the nozzle of FIG. 18A.

FIG. 18A illustrates an isometric view of another embodiment of a nozzle 209b and FIG. 18B illustrates a cross-sectional view of the nozzle 209b. The nozzle opening 210b is smaller than the nozzle opening 210 described above. As shown in the cross-sectional view of FIG. 18B, this requires a greater reduction of cross-sectional area within the nozzle 209b (as compared with FIG. 17B). Those of skill in the art will appreciate that that the nozzle opening 210 (as well as its cross-sectional shape) can be varied to achieve various flow characteristics as desired. These variations are intended to be within the scope of this disclosure.

FIG. 19 illustrates an isometric view of an embodiment of an insert 299 for the waterjet apparatus 200. In some embodiments, the insert 299 can be press fit (or otherwise installed, for example, with adhesive) into the openings 283 on the stem 219 and configured to receive the fasteners 298. The insert 299 can include interior threads 272 for engaging threads on the fasteners 298. The insert 299 can include a textured, patterned, or otherwise increased-friction surface 273 configured to engage the interior of the openings 283. For example, in the illustrated embodiment, the exterior surface 273 of the insert 299 is knurled. As illustrated, for some embodiments, the insert 299 includes longitudinally extending cutouts 274 that allow the insert 299 to be compressed for insertion into the openings 283 and then to be expanded to remain positioned within the opening. In some embodiments, the insert 299 comprise metal, such as brass, for example.

Figure 20:
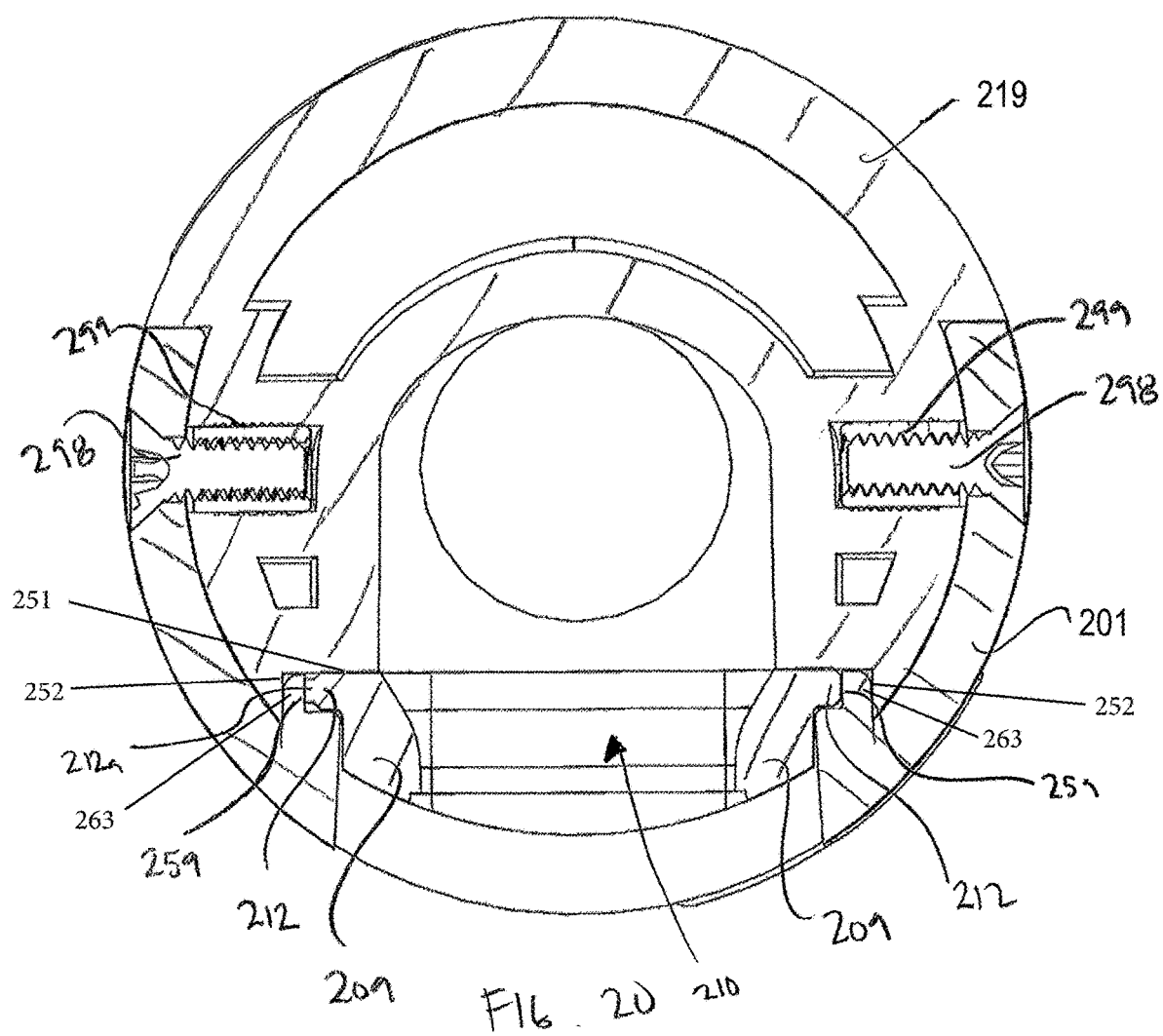
FIG. 20 is a cross-sectional view of the waterjet apparatus of FIG. 11A, which illustrates an example positioning of the nozzle between the stem and the removable stem cap.

FIG. 20 is a cross-sectional view of the waterjet apparatus 200 taken along a plane that is normal to the longitudinal axis and that bisects the fasteners 298. As shown in this figure, the nozzle 209 is secured between the stem 219 and the removable stem cap 201. The grooves 259 in the removable stem cap 201 receive the flanges 212 of the nozzle 209 and limit the nozzle 209 from moving substantially in both circumferential or radial directions by securing the nozzle 209 against the surface 251 of the stem 219 and between the grooves 259. That is, the interaction between the grooves 259, the flanges 212, and the surface 251 substantially limit the nozzle 209 from moving up and down (relative to the orientation shown in the figure) and right and left (again, relative to the orientation shown in the figure. The extensions 263 on the removable stem cap 201 that include the grooves 259 also contact the flanges 252 of the stem 219, such that the extensions 263 of the removable stem cap 201 are bounded between the flanges 252. In some embodiments, one or more of the flanges 212 of the nozzle 209 can narrow to a nib 212a. In some embodiments, the nib 212a can be omitted.

Various embodiments and examples of assemblies have been disclosed. Although the assemblies have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above.

What is claimed is:

1. A waterjet apparatus for cleaning an artificial body of water, the waterjet apparatus comprising:
   a housing comprising a housing periphery about a central axis of the housing, the housing periphery defining an outermost boundary of the housing;
   a head movably connected to the housing, the head configured to reciprocate correspondingly with an intermittent delivery of pressurized water and configured to direct the pressurized water along a desired direction to clean the artificial body of water, wherein the head rotates about the central axis of the housing after delivery of pressurized water; and
   a plaster attachment device configured to be connected to the head, the plaster attachment device comprising a plaster attachment device periphery about the central axis, the plaster attachment device periphery substantially aligned with the housing periphery along the central axis, and the plaster attachment device comprising a plaster opening and a sidewall, the plaster opening configured to receive and support plaster mixtures substantially matching plaster mixtures of a wall configured to contain the artificial body of water, the plaster opening configured to support plaster at a desired depth, the sidewall configured to support plaster at a desired radius, the plaster attachment device comprising a connection flange configured to secure the plaster attachment device to the head, the connection flange comprising an opening configured to engage a release actuator connected to the head to secure the plaster attachment device to the head, wherein the release actuator comprises at least one of: (i) a button biased outwardly from the head via a spring or other elastic member, or (ii) a fastener oriented transverse to the central axis and configured to be connected to the head with the plaster attachment device positioned on the head.

2. The apparatus of claim 1, wherein the plaster attachment device comprises a retention flange extending into the plaster opening, the retention flange configured to maintain the plaster in the plaster opening.

3. The apparatus of claim 1, wherein the plaster attachment device comprises a supporting wall extending radially outward from the central axis, the supporting wall configured support plaster in the plaster opening.

4. The apparatus of claim 3, wherein the supporting wall and the sidewall are substantially perpendicular such that at least a part of the sidewall extends substantially along and about the central axis.

5. The apparatus of claim 3, wherein the supporting wall is substantially flat from the central axis leading to the sidewall.

6. The apparatus of claim 1, wherein the plaster attachment device comprises a slot at the plaster attachment device periphery, the slot configured to mate with a maintenance tool.

7. The apparatus of claim 6, wherein the plaster attachment device comprises a retention flange extending into the plaster opening, the retention flange configured to maintain plaster in the plaster opening, and wherein the retention flange extends toward the central axis from the slot.

8. The apparatus of claim 6, wherein the sidewall comprises an indentation in the sidewall in the plaster opening toward the central axis to accommodate the slot at the plaster attachment device periphery while maintaining a desired thickness of the sidewall at the slot.

9. The apparatus of claim 1, further comprising a sleeve configured to be positioned in the wall configured to contain the artificial body of water, the sleeve engaging the housing to position the housing in a predetermined position relative to the sleeve, wherein an uppermost surface of the sleeve is below an uppermost surface of the plaster attachment device along the central axis.

10. The apparatus of claim 9, further comprising a riser ring configured to be positioned at least partially within the sleeve, the riser ring circumscribing the plaster attachment device about the central axis when pressurized water is not being delivered to the head, wherein an uppermost surface of the riser ring is substantially flush with the uppermost surface of the plaster attachment device when pressurized water is not being delivered to the head.

11. The apparatus of claim 1, further comprising a sleeve configured to be positioned in the wall configured to contain the artificial body of water, the sleeve engaging the housing to position the housing in a predetermined position relative to the sleeve, wherein an uppermost surface of the sleeve is substantially flush with an uppermost surface of the plaster attachment device when pressurized water is not being delivered to the head.

12. The apparatus of claim 1, wherein the plaster opening has a depth along the central axis of about $\frac{1}{8}$ inches to about 1 inch.

13. The apparatus of claim 1, wherein the plaster mixtures comprise plaster and pebbles.

14. The apparatus of claim 1, wherein the connection flange extends beyond the plaster opening along a central axis of the plaster attachment device.

15. The apparatus of claim 1, wherein the fastener comprises a screw or a bolt.

* * * * *